US012801210B2

(12) United States Patent
Lawson et al.

(10) Patent No.: US 12,801,210 B2
(45) Date of Patent: Nov. 17, 2026

(54) SYSTEMS AND METHODS FOR MEASURING DELAY IN REPRESENTING BODY MOTION IN A VIRTUAL ENVIRONMENT

(71) Applicant: TRU Simulation + Training, Lutz, FL (US)

(72) Inventors: Matthew Edward Lawson, Wesley Chapel, FL (US); Rafael Antonio Longo, Lutz, FL (US); Joseph Michael Corrao, New Port Richey, FL (US)

(73) Assignee: TRU Simulation + Training, Lutz, FL (US)

( * ) Notice: Subject to any disclaimer, the term of this patent is extended or adjusted under 35 U.S.C. 154(b) by 128 days.

(21) Appl. No.: 18/890,607

(22) Filed: Sep. 19, 2024

(65) Prior Publication Data

US 2026/0079565 A1 Mar. 19, 2026

(51) Int. Cl.

| | |
|---|---|
| ***G06F 3/01*** | (2006.01) |
| ***G02B 27/01*** | (2006.01) |
| ***G06F 3/03*** | (2006.01) |
| ***G06F 3/0346*** | (2013.01) |
| ***G06T 11/00*** | (2006.01) |
| *G02B 6/35* | (2006.01) |
| *G09B 9/00* | (2006.01) |

(52) U.S. Cl.

CPC ............ *G06F 3/011* (2013.01); *G02B 27/017* (2013.01); *G06F 3/017* (2013.01); *G06F 3/0304* (2013.01); *G06F 3/0346* (2013.01); *G06T 11/00* (2013.01); *G02B 6/3586* (2013.01); *G02B 27/0179* (2013.01); *G02B 2027/0181* (2013.01); *G02B 2027/0187* (2013.01); *G09B 9/00* (2013.01)

(58) Field of Classification Search

CPC ........ G06F 3/011; G06F 3/017; G06F 3/0304; G06F 3/0346; G06T 11/00; G02B 27/017; G02B 6/3586; G02B 27/0179; G02B 2027/0181; G02B 2027/0187; G09B 9/00

See application file for complete search history.

(56) References Cited

U.S. PATENT DOCUMENTS

2018/0250599 A1 9/2018 Kuehne
2019/0114835 A1 4/2019 Costa et al.
2019/0391647 A1 12/2019 Rihn et al.
2023/0267590 A1* 8/2023 Goergen ................ A63G 31/16 348/129
2024/0212302 A1* 6/2024 Sorg ........................ G06T 19/20

* cited by examiner

*Primary Examiner* — Adam R. Giesy
(74) *Attorney, Agent, or Firm* — Slater Matsil, LLP

(57) ABSTRACT

A method, apparatus, and medium are provided. The method includes generating a virtual environment (VE) including at least a first shape that precisely fills a virtual field of view from the first virtual viewpoint, receiving from a first hand contact sensor, signaling indicating contact, receiving from a second hand contact sensor, signaling indicating contact, where the second hand contact sensor is a first distance from the first hand contact sensor, tracking the operator's hand motion and updating the VE based on the position of the operator's hand, changing a luminance of the HMD when the virtual hand is within a threshold distance from a virtual representation of the second hand contact sensor, receiving signaling based on changing the luminance of the HMD, and generating a data file encoding the signaling from the first hand contact sensor, the second hand contact sensor, and the light sensor.

20 Claims, 7 Drawing Sheets

SYSTEMS AND METHODS FOR MEASURING DELAY IN REPRESENTING BODY MOTION IN A VIRTUAL ENVIRONMENT

TECHNICAL FIELD

The present disclosure relates generally to measuring viewpoint fidelity for a head mounted display, and in particular embodiments, to measuring and quantifying body part tracking delay.

BACKGROUND

Flight simulator technology has evolved with the incorporation of head-mounted displays (HMDs), bringing new challenges and opportunities for creating immersive training environments. Such simulations involve a blend of sophisticated hardware and software solutions to ensure a realistic and effective simulation experience.

At the core of these systems are advanced motion facilitating and tracking technologies, including the use of such technologies to provide the realistic output for displaying to the HMD and otherwise. Such technologies typically combine optical systems using cameras and sensors with inertial measurement units, providing precise head position and orientation data. This tracking is crucial for rendering accurate visuals in the HMD as the user moves within a training apparatus.

In various contexts, undesirable position changes may affect the HMD. For example, position changes and/or vibration caused by motion cueing or other components may impact an HMD and lead to false visual cues. Another example may be failing to accurately reproduce or accurately position body parts that should be in a user's point of view. Such false visual cues may introduce motion sickness when viewing the viewpoint associated with the HMD, and/or reduce the realism of the user's perspective when viewing the viewpoint associated with the HMD.

Determining transience of errors introduced to a viewpoint associated with a user movement, however, has remained challenging to ensure that simulated viewpoints remain accurate to an acceptable level. Embodiments of the present disclosure include methods, devices, and non-transitory computer-readable storage media that utilize particular elements to overcome these challenges to measure body part tracking delay.

SUMMARY OF THE INVENTION

Technical advantages are generally achieved by embodiments of this disclosure which describe measuring viewpoint fidelity in a head mounted display.

In accordance with a first aspect of the disclosure, a method is provided. An example method includes generating a virtual environment of a test scenario for a head mounted display (HMD) mounted to a model head on a test stand, where the virtual environment includes at least a first shape, where the first shape is a shape that precisely fills a virtual field of view from the first virtual viewpoint, and the virtual environment is configured to replicate hand or body motion in a real-world field of view of the HMD, receiving, by a data acquisition system (DAQ), from a first hand contact sensor, signaling indicating contact by an operator's hand, receiving, by the DAQ, from a second hand contact sensor, signaling indicating contact by the operator's hand, where the second hand contact sensor is a first distance from the first hand contact sensor, tracking the operator's hand motion in the real world by one or more body part tracking sensors, updating the virtual environment based on a tracked real world position of the operator's hand motion, changing a luminance of the HMD based on the virtual environment updating the position of the operator's hand within a minimum threshold distance from a virtual representation of the second hand contact sensor, receiving, by the DAQ, from a light sensor mounted on the model head, signaling based on changing the luminance of the HMD, and generating, by the DAQ, a data file encoding the signaling from the first hand contact sensor, the second hand contact sensor, and the light sensor.

In a second aspect of the disclosure an apparatus is provided. An example apparatus includes one or more processors, and at least one non-transitory computer readable memory connected to the one or more processors and including computer program code, where the at least one non-transitory computer readable memory and the computer program code are configured, with the one or more processors, to cause the apparatus to at least: generate a virtual environment for a head mounted display (HMD) mounted to a model head on a test stand, where the virtual environment includes at least a first shape, where the first shape is a shape that precisely fills a virtual field of view from the first virtual viewpoint, and the virtual environment is configured to replicate hand or body motion in the real-world field of view of the HMD, receive, by a data acquisition system (DAQ), from a first hand contact sensor, signaling indicating contact by an operator's hand, receive, by the DAQ, from a second hand contact sensor, signaling indicating contact by the operator's hand, where the second hand contact sensor is a first distance from the first hand contact sensor, track the operator's hand motion in the real world by one or more body part tracking sensors, update the virtual environment based on a tracked real world position of the operator's hand motion, change the luminance of the HMD based on the virtual environment updating the position of the operator's hand within a minimum threshold distance from a virtual representation of the second hand contact sensor, receive, by the DAQ, from a light sensor mounted on the model head, signaling based on changing the luminance of the HMD, and generate, by the DAQ, a data file encoding the signaling from the first hand contact sensor, the second hand contact sensor, and the light sensor.

In a third aspect of the disclosure, a non-transitory computer-readable storage medium is provided. In some examples, the non-transitory computer-readable storage medium includes computer program instructions stored thereon that, when executed by at least one processor, causes a device to perform: generating a virtual environment for a head mounted display (HMD) mounted to a model head on a test stand, where the virtual environment includes at least a first shape, where the first shape is a shape that precisely fills a virtual field of view from the first virtual viewpoint, and the virtual environment is configured to replicate hand or body motion in the real world field of view of the HMD, receiving, by a data acquisition system (DAQ), from a first hand contact sensor, signaling indicating contact by an operator's hand, receiving, by the DAQ, from a second hand contact sensor, signaling indicating contact by the operator's hand, where the second hand contact sensor is a first distance from the first hand contact sensor, tracking the operator's hand motion in the real world by one or more body part trackers, updating the virtual environment based on a tracked real world position of the operator's hand motion, changing a luminance of the HMD based on the virtual environment updating the position of the operator's hand within a minimum threshold distance from a virtual representation of the second hand contact sensor, receiving, by the DAQ, from a light sensor mounted on the model head, signaling based on changing the luminance of the HMD and generating, by the DAQ, a data file encoding the signaling from the first hand contact sensor, the second hand contact sensor, and the light sensor.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
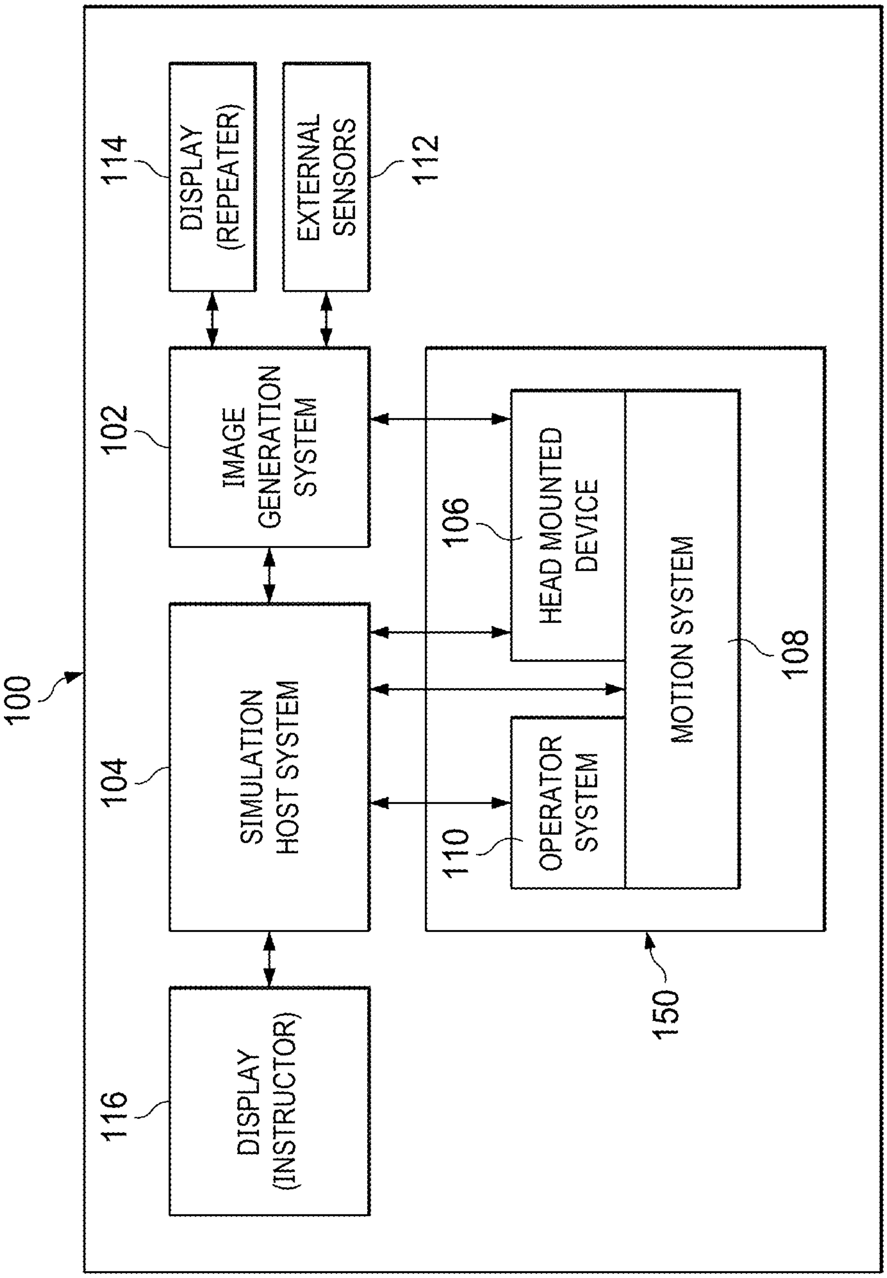
FIG. 1 a block diagram illustrating an HMD flight simulator system in accordance with at least one aspect of the disclosure.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions, and/or alterations can be made herein without departing from the spirit and scope of this disclosure as defined by the appended claims.

Simulating a virtual environment involves generating and depicting virtualized versions of real-world objects, items, and environments that are output to a display for depicting to a user. A head mounted display (HMD) may be utilized by a user to provide realistic input/output to a display, and/or otherwise immerse a user in the simulation to provide a more realistic simulation experience. For example, the HMD may be worn by the user such that as the user performs a movement (e.g., rotates and/or otherwise repositions their head), a viewpoint of a virtual environment that is displayed is updated based on the movement performed. In some embodiments, hand, arm, or other body parts in the field of view may be detected by tracking sensors, and real-time representations of the current position and/or orientation of the hand, arm, or other body part may be populated in the virtual environment.

In various contexts, including simulation of vehicle movements such as aerial vehicles, additional specialized hardware and/or software components may be utilized for any of a myriad of purposes. Particular hardware and/or software components in some contexts are provided that match real-world controls of the particular context. For example, in one such context where a simulation is provided for controlling a particular aerial vehicle (e.g., a flight simulator for training a pilot on a particular aerial vehicle), specialized hardware that matches the exact controls of the particular aerial vehicle may be provided as part of the training apparatus. The training apparatus may also include a motion cueing system that manipulates the training apparatus along with the user within. For example, a motion cueing system may affect the training apparatus to simulate movement effects based on the inputs provided by the user through any of a myriad of controls, such as movements in any one or more of 6 degrees of freedom or combination thereof. In certain contexts, such as using a training apparatus to simulate piloting a particular aerial vehicle during training of a pilot for that aerial vehicle, maintaining a realistic virtual environment and viewpoint is particularly desirable to ensure that the training performed will accurately map to the pilot's real-world experience in controlling the particular aerial vehicle.

Components of the training apparatus, particularly the motion cueing system for example, and/or body part tracking and virtualization systems, may impact operation of the HMD in an undesirable manner. For example, in simulations where the user needs to manipulate components in the virtual environment, or where the virtual environment may need to show manipulation of real-world objects reproduced in a virtual environment (e.g., a cockpit instrument, button, or control, or the like), real-time positioning of a user's hand in the field of view is necessary. Excessive delays or mismatches between the real-world position versus a reproduced virtual world position may result in improper control operation, inability of the user to locate the actual control desired to manipulate, reduced simulation training effectiveness, user discomfort, and/or motion sickness.

Determining, and compensating for, such false visual cues is desirable to reduce or eliminate these negative effects. In this regard, a testing procedure may be desirable for use in determining what, if any, errors are present in operation of an HMD on a training apparatus. Such a testing procedure includes use of the training apparatus and related viewpoint outputted in accordance with the simulation to perform one or more defined procedures that indicate whether body part (e.g., hand or arm) motion in a HMD is properly accounted for, or whether such motion effects are negatively impacting the operation of the HMD to a level that is not acceptable for realistic simulation use.

Motion sickness in virtual reality (VR) is a common issue where users experience symptoms such as dizziness, nausea, and disorientation. This condition arises from a disconnect between the visual information perceived by the eyes and the body's sense of movement, leading to sensory conflict. Mismatch between physical movement and the lack of corresponding perceived motion in the virtual world, or movement counter to the rendered VR movement, can confuse the brain, resulting in motion sickness.

The severity of motion sickness in VR can vary depending on several factors, including the design of the VR experience (e.g., latency and mismatch between reality and VR), the individual's sensitivity, and the duration of exposure. While the individual's sensitivity cannot be controlled, and the duration of exposure is a procedural issue, limiting the mismatch between reality and VR can be controlled by measuring and quantifying latency to determine if system response is within a given threshold of performance.

Embodiments of the disclosure include particular methods, apparatuses, and non-transitory computer readable storage media for measuring tracking delays of body parts in a head mounted display, and specifically with regard to measuring and quantifying the delay in tracking hand motion. In this regard, such procedures in some embodiments provide a virtualized simulation environment that includes specially configured elements utilized to perform such measuring. The specially configured elements may be updated as described herein as one or more inputs are received, where the specially configured elements enable such measuring.

Example embodiments based on measuring tracking delays of body parts in a simulation involving an HMD are described, for example as part of measuring and/or testing the validity of a flight simulation system. Additionally and/or alternatively, example embodiments, based on measuring and quantifying the signal time delay between movement of a hand or body part and corresponding movement of the virtual viewpoint within a virtual scene, testing may be performed that indicates whether such data distinguishes that a test of the delay passes or fails.

FIG. 1 illustrates a block diagram for an example system in accordance with at least one aspect of the disclosure. Specifically, FIG. 1 illustrates an example system 100. The example system 100 includes a simulation apparatus 150, at least one display (e.g., display 114 and display 116), a simulation host system 104, and an image generation system 102. In some embodiments, the system 100 optionally includes one or more external sensors 112.

The simulation apparatus 150 includes any number of components, including any number of devices, sub-systems, or other hardware and/or software, that enables simulation of a particular environment, for example an environment for operating a particular vehicle. In some embodiments, the simulation apparatus 150 includes an operator system 110, a head mounted display (HMD) 106, and a motion system 108. The head mounted display 106 in some embodiments is mounted on or otherwise secured to a test stand, such that a manipulation to the test stand manipulates a position and/or orientation of the head mounted display 106. In some embodiments, the head mounted display 106 is mounted to or otherwise secured to a user in the simulation apparatus 150, for example that is operating certain controls thereof as part of simulating operation of a vehicle via the simulation environment.

The head mounted display 106 includes a display and one or more input and/or output elements. For example, in some embodiments, the head mounted display 106 includes a virtual reality headset. The head mounted display 106 may include one or more displays that depict a virtual viewpoint, or multiple virtual viewpoints, of a virtual environment. The head mounted display 106 additionally may include one or more sensors that determine and/or record a headset orientation, position, movement, and/or the like. In some embodiments, the head mounted display 106 is worn by a user, for example an operator associated with the simulation apparatus 150. Additionally or alternatively, in some embodiments, the head mounted display 106 is secured to a test stand that functions to replace a user head in the simulation apparatus 150. The test stand may be configured to enable movement along a particular test axis, for example such that the head mounted display 106 is similarly moved in accordance with the movement along the test axis. In some embodiments, the test stand may be a locked test stand or a fixed test stand, with no freedom of motion in any direction. In some embodiments, the head mounted display 106 includes the Varjo™ XR-4 series headset.

The operator system 110 is configured to provide input in accordance with a particular environment to be simulated. For example, in some embodiments, the operator system 110 includes control inputs that mirror those of a particular vehicle for which simulated operation is to be performed. In one example context, the operator system 110 includes cockpit controls of an aerial vehicle for which simulated operation is to be performed. Such inputs may correspond to data values that represent updates to such controls, including any number of analog and/or digital inputs, as a user interacts with such controls.

The motion system 108 simulates movement, vibrations, and/or other motion associated with an environment. In one example context, the motion system 108 simulates motion effects associated with operation of an aerial vehicle, for example based on inputs and/or determined simulation states associated with such a system of the aerial vehicle operating. In some embodiments, the motion system 108 comprises a base system upon which one or more other components of the simulation apparatus 150 are mounted for simulating such motion effects. For example, in some embodiments, the operator system 110 and/or the head mounted display 106 are mounted on, secured to, or otherwise positioned on the motion system 108. In this regard, motion effects initiated by the motion system 108 affect the position and/or orientation of such other components. In some embodiments, the motion system 108 includes a CKAS W10 6-degree of freedom (DOF) motion system.

The system 100 further includes a simulation host system 104. The simulation host system includes hardware, software, firmware, and/or any combination thereof, that generates, maintains, and/or configures a simulation environment. For example, in some embodiments, the simulation host system 104 includes a specially configured server, where the server includes at least software executed on specially configured hardware that maintains the simulation environment. For example, the simulation host system 104 may include at least one processor (e.g., a CPU, multiple CPUs, and/or the like), and at least one non-transitory computer-readable storage medium (e.g., a memory), and is configured to execute the simulation environment upon execution of computer program instructions stored on the at least one non-transitory computer-readable storage medium by the at least one processor.

In some embodiments, the simulation host system 104 maintains one or more simulation environments based on generated and/or received data associated with at least one element of the simulation environment. For example, in some embodiments, the simulation host system 104 receives input data from the operator system 110, motion system 108, and/or head mounted display 106. The operator system 110 may provide input associated with user (e.g., an operator) interactions with controls of the operator system 110, the head mounted display 106 may provide orientation and/or position data based on movement of the head mounted display 106, and/or the motion system 108 may provide movement data indicating changes to orientation, position, vibrations, and/or other movements, for example where such movements affect the other components of the simulation apparatus 150. Such data may be provided directly to the simulation host system 104, or in other embodiments is provided via one or more intermediary devices. In some embodiments, the simulation host system 104 is specially configured to include an instance of Unreal Engine's™ TRU simulation environment.

In some embodiments, the system 100 includes one or more external sensors 112. The external sensors may detect and/or measure one or more aspects associated with the simulation apparatus 150, and/or a portion thereof, for use in configuring the virtual environment and/or a virtual viewpoint of the virtual environment. In some embodiments, the external sensors 112 include movement sensors, cameras, and/or the like. In some embodiments, the external sensors 112 are used to detect particular elements in or associated with the simulation apparatus 150, for example positions of a hand of an operator interacting with the simulation apparatus 150. Additionally or alternatively, in some embodiments, the external sensors 112 measure data values associated with the environment of or around the simulation apparatus 150.

In some embodiments, the system 100 includes an image generation system 102. The image generation system 102 includes hardware, software, firmware, and/or any combination thereof, that generates and/or provides output data for rendering to one or more displays. The output data includes renderings of a virtual viewpoint within a virtual environment, for example as simulated by the simulation host system 104. In some embodiments, the image generation system 102 and the simulation host system 104 share one or more hardware and/or software components, for example where the simulation host system 104 and the image generation system 102 are executed on the same server, and/or where the simulation host system 104 and the image generation system 102 are embodied by submodules of a particular simulation software package. In one example embodiment, the image generation system 102 comprises a single image generation channel, for example of an instance of Unreal Engine's™ TRU simulation environment. In some embodiments, the external sensors 112 may provide measured data to the image generation system 102 and/or the simulation host system 104 for processing as part of configuring one or more virtual elements in a virtual environment.

The image generation system 102 is configured to render particular shapes and other virtual elements of the virtual environment generated, maintained, and/or otherwise configured by the simulation host system 104. In some embodiments, the image generation system 102 provides output data for rendering to one or more displays of the display 114 (e.g., a repeater display), display 116 (e.g., an instructor display), and/or a display of the head mounted display 106. In this regard, the image generation system 102 may continuously cause outputting and/or cause rendering of frames depicting a virtual viewpoint of the virtual environment as updated inputs affecting the virtual environment are received, for example changes in orientation and/or position of the head mounted display 106, control input changes via the operator system 110, and/or motion cueing data from the motion system 108 of the simulation apparatus 150.

In some embodiments, the image generation system 102 includes a specially configured server, where the server includes at least software executed on specially configured hardware that configures renderings of a virtual viewpoint for a virtual environment, for example maintained by the simulation host system 104. The image generation system 102 may include at least one processor (e.g., a CPU, multiple CPUs, and/or the like), and at least one non-transitory computer-readable storage medium (e.g., a memory), and is configured to cause the renderings upon execution of computer program instructions stored on the at least one non-transitory computer-readable storage medium by the at least one processor.

In some embodiments, the system 100 includes any number of displays, each configured to render data viewable by one or more viewers. As illustrated, the head mounted display 106 includes at least one display that provides renderings of a virtual environment. For example, in some embodiments the head mounted display 106 embodies a headset including one or more display that are configured to provide viewing of a three-dimensional virtual environment while wearing the head mounted display 106. Additionally or alternatively, as illustrated, the system 100 includes a display 114 that functions as a repeater display. In this regard, the display 114 may render the same data as outputted to the head mounted display 106, such that the corresponding renderings may be viewed external from the head mounted display 106 by one or more users. Additionally or alternatively, as illustrated, the system 100 further includes a display 116 that functions as an instructor display. The instructor display in some embodiments includes a second repeat display that renders the same data as outputted to the head mounted display 106. In some embodiments the display 116 includes one or more additional and/or alternative renderings that are specific to that display, for example additional UI elements, controls, and/or the like that are specific to operations performed by another user associated with the simulation (e.g., instructor-specific operations). In this regard, the image generation system 102 may provide data representing a virtual viewpoint of a simulation environment for rendering to any one or more of such displays associated therewith.

Figure 2:
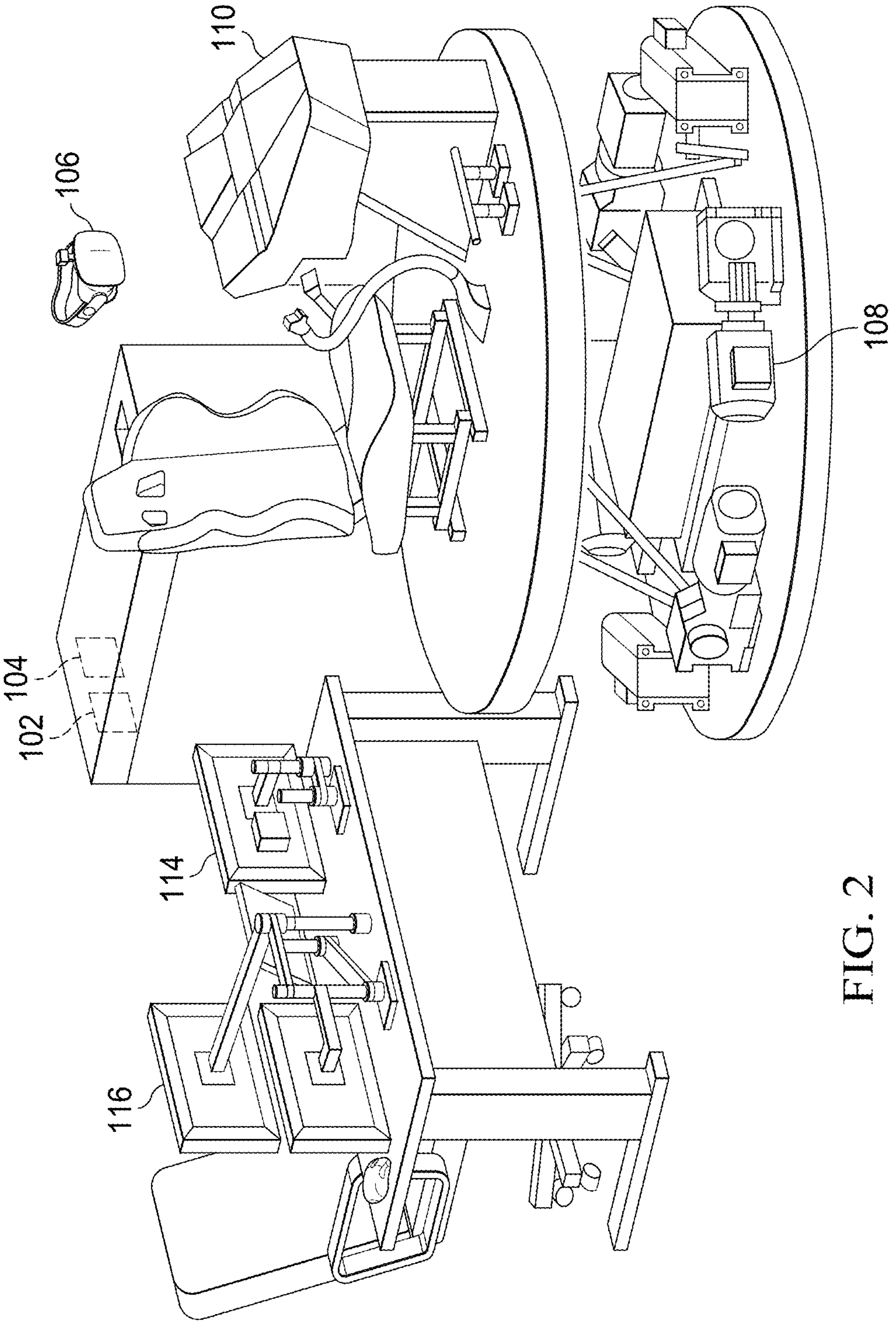
FIG. 2 illustrates a depiction of devices positioned for an example system in accordance with at least one aspect of the disclosure.

FIG. 2 illustrates a depiction of devices positioned for an example system in accordance with at least one aspect of the disclosure. As depicted, the operator system 110 includes any number of subcomponents, for example in some embodiments the operator system 110 includes one or more cockpit controls, one or more primary controls, and/or one or more input/output (I/O) components. The operator system 110 includes a seat or other control where an operator may be located (e.g., seated) during operation of the operator system and/or the simulation apparatus 150 associated therewith.

Further as depicted, the operator system 110 and the head mounted display 106 may be positioned such that they are secured to, or otherwise positioned on top of, the motion system 108. In this regard, each movement and/or motion performed via the motion system 108 may impact such other devices positioned on the motion system 108. The display 116, display 114, image generation system 102, and simulation host system 104 are positioned separately from the motion system 108, such that movements of the motion system 108 do not impact such other devices. The various components may be communicatively coupled via wired and/or wireless means to perform the data transmissions described herein.

Figure 3A:
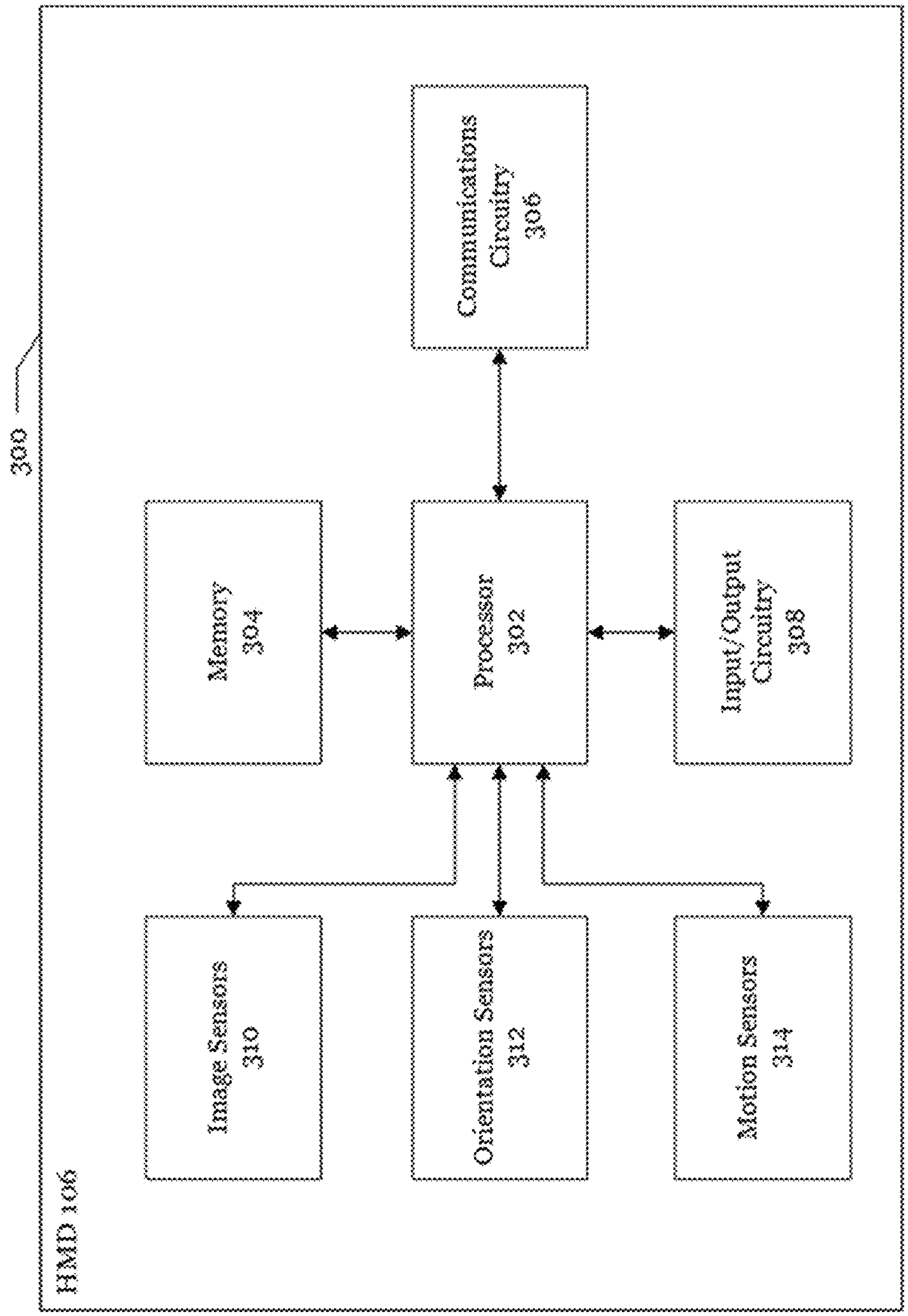
FIG. 3A illustrates a block diagram of an example HMD in accordance with at least one aspect of the disclosure.

FIG. 3A illustrates a block diagram of an example HMD in accordance with at least one aspect of the disclosure. Specifically, FIG. 3A depicts an example apparatus 300 embodying an example of the HMD 106. The apparatus 300 includes a processor 302, a memory 304, a communications circuitry 306, an input/output circuitry 308, one or more image sensors 310, one or more orientation sensors 312, one or more motion sensors 314, and/or one or more combination orientation and motion sensors. The apparatus 300 may be configured, using one or more of the circuitry depicted, to execute the operations described herein.

An apparatus 300 may include one or more processors 302 and one or more computer readable medium (such as memory 304) storing computer code thereon. References to computer-readable storage medium, computer program product, tangibly embodied computer program, or the like, or a controller, monitor, monitoring system, computer, processor, or the like should be understood to encompass not only computers having different architectures such as single or multi-processor architectures and sequential (Von Neumann) or parallel architectures but also specialized circuits such as field-programmable gate arrays (FPGAs), application specific circuits (ASICs), signal processing devices and other devices. References to computer program, instructions, code, or the like, should be understood to encompass software for a programmable processor or firmware such as, for example, the programmable content of a hardware device whether instructions for a processor, or configuration settings for a fixed-function device, gate array or programmable logic device, or the like.

The apparatus 300 may have at least one processor 302 and at least one memory 304, such as a non-transitory computer readable medium, and may include computer program code, that is configured to, with the at least one processor, perform the method described herein. The memory 304 may be a single component or it may be implemented as one or more separate components some or all of which may be integrated or removable and may provide permanent, semi-permanent, dynamic, or cached storage.

The one or more processors 302 are configured to read from and write to the at least one memory 304. The processor may also comprise a bus or an output interface via which data or commands are output by the processor 302 and an input interface via which data or commands are input to the processor 302. The memory 304 stores a computer program including computer program instructions that control the operation of apparatus 300, when loaded into the processor. The computer program instructions provide the logic and routines that enable the apparatus to perform the HMD virtualization in real time and/or track body part latency. The processor 302, by reading the memory 304, is able to load and execute the computer program. The computer program or programs may arrive at the apparatus via any suitable delivery mechanism. The delivery mechanism may be, for example, a computer-readable storage medium, a computer program product, a memory device, a record medium such as a compact disc read on only memory (CD-ROM), digital versatile disc (DVD), portable memory such as a memory stick or hard drive, or the like, an article of manufacture that tangibly embodies the computer program. In some embodiments, the delivery mechanism may be a signal configured to reliably transfer the computer program over the air or via an electrical connection.

Although the components are described with respect to functional limitations, it should be understood that the particular implementations necessarily include the use of particular hardware. It should also be understood that certain components described herein may include similar or common hardware. For example, two sets of circuitry and/or modules may both leverage use of the same processor, network interface, storage medium, or the like to perform their associated functions, such that duplicate hardware is not required for each set of circuitry. The use of the term “module” and/or the term “circuitry” as used herein with respect to components of the apparatus 300 should therefore be understood to include particular hardware configured to perform the functions associated with the particular sets of circuitries as described herein.

Additionally or alternatively, the terms “circuitry” and “module” should be understood broadly to include hardware and, in some embodiments, software and/or firmware for configuring the hardware. For example, in some embodiments “circuitry” and “module” may include processing circuitry, non-transitory storage media, network interfaces, input/output devices, and/or the like. In some embodiments, other elements of the apparatus 300 may provide or supplement the functionality of the particular set of circuitries. The processor 302 may provide processing functionality, the memory 304 may provide processing functionality, the memory 304 may provide storage functionality, the communications circuitry 306 may provide network interface functionality, and the like.

In some embodiments, the processor 302 (and/or processor or any other processing circuitry assisting or otherwise associated with the processor) may be in communication with the memory 304 via a bus for passing information among components of the apparatus 300. The memory 304 may be non-transitory and may include, for example, one or more volatile and/or non-volatile memories. In other words, for example, the memory may be an electronic storage device (e.g., a computer readable storage medium). The memory 304 may be configured to store information, data, content, applications, instructions, or the like, for enabling the apparatus 300 to carry out various functions in accordance with example embodiments of the present disclosure.

The processor 302 may be embodied in any one or more of a myriad of ways and may, for example, include one or more processing devices configured to perform independently. Additionally or alternatively, the processor 302 may include one or more processors configured in tandem via a bus to enable independent execution of instructions, pipelining, and/or multithreading. The use of the terms “processor,” “processing module,” and “processing circuitry” may be understood to include a single-core processor, a multi-core processor, multiple processors internal to the apparatus, field-programmable gate array (FPGA), graphic processing unit (GPU), application specific integrated circuit (ASIC), and/or remote and/or cloud processors.

In an example embodiment, the processor 302 may be configured to execute computer-coded instructions stored in the memory 304 or otherwise accessible to the processor. Alternatively, or additionally, the processor 302 may be configured to execute hard-coded functionality. As such, whether configured by hardware or software methods, or by a combination thereof, the processor 302 may represent an entity (e.g., physically embodied in circuitry) capable of performing operations according to an embodiment of the present disclosure while configured accordingly. Alternatively, as another example, when the processor is embodied as an executor of software instructions, the instructions may specially configure the processor to perform the algorithms and/or operations described herein when the instructions are executed.

In one example context, the system 100, in conjunction with apparatus 300, may be configured to record, measure, and/or provide data associated with the orientation, position, movement, and/or elements associated with interacting with the HMD. In some embodiments, the system 100 may be configured to track, record, measure, provide data, and/or provide virtual representations of body parts such as hand and/or arm motion within the field of view of the HMD in real time. Additionally or alternatively, in some embodiments, the system 100 may be configured to generate (for example, by rendering) a virtual environment using apparatus 300. The system 100 generates the virtual environment including at least a first shape and a second shape in a virtual viewpoint of the virtual environment. The system 100 may generate the first shape and second shape as affixed in the virtual environment. The virtual viewpoint of the virtual environment may be configured to shift in response to movement of a head mounted display secured to a test stand and may result in "seeing" more or less of each of the first shape and/or the second shape. The system 100 may be configured to update the generated virtual viewpoint of the virtual environment in response to positioning information corresponding to a movement of the test stand. The system 100 is further configured to provide HMD spatial position data associated with the apparatus 300 secured to the test stand.

In some embodiments, the system 100 may be configured with tracking sensors that record and/or provide data or information regarding the position of body parts in real time to the system 100. In some embodiments, the system 100 may further include hardware and/or software to render virtual representations of body parts in real time. In the context of this disclosure, body parts may include any portion of a user's body, including, but not limited to, feet, legs, hands, arms, fingers, torso, and head. In some embodiments, the system 100, may also include proximity detection capabilities for real world and/or virtual representations of body parts within threshold ranges of real world and/or virtual objects. For example, the system 100 may provide data or information when a virtual representation of a user's hand is within a threshold distance from a virtual point corresponding to a real-world object such as a button or the like. In some embodiments, the system 100 is configured to continuously generate the virtual environment, for example to a display, as updated data associated with the virtual environment is received.

In some embodiments, the apparatus 300 may include input/output circuitry 308 that may, in turn, be in communication with processor 302 to provide output to the user and in some embodiments, to receive an indication of one or more user inputs. The input/output circuitry 308 may comprise a user interface and may include a display (e.g., for rendering one or more user interfaces, such as to the display). The user interfaces comprise a web user interface, customized device application, native device interface, a mobile and/or desktop application, or in some embodiments includes a client device linked or otherwise networked to an associated system configuring the virtual environment. In some embodiments, the input/output circuitry 308 may also include gesture controls, soft keys, buttons, a microphone, a speaker, touch areas, and/or other input/output mechanisms. The processor, such as the processor 302, and/or the user interface circuitry comprising the processor, for example processor 302, may be configured to control one or more functions of one or more user interface elements through computer program instructions (e.g., software and/or firmware) stored on a memory accessible to the processor 302 (e.g., via memory 304, and/or the like).

The communications circuitry 306 may be any means, including for example and without limitation a device or circuitry embodied in hardware, software, firmware, and/or any combination thereof, which is configured to receive and/or transmit data from and/or to a network and/or any other device, circuitry, or module in communication with the apparatus 300. In this regard, the communications circuitry 306 may include, for example, a network interface for enabling communications with a wired or wireless communications network. For example, the communications circuitry 306 may include one or more network interface cards, antennas, buses, switches, routers, modems, and supporting hardware and/or software, or any other device suitable for enabling communications via a network. Additionally or alternatively, in some embodiments the communication interface may include the circuitry for interacting with the antennas to cause transmission of signals via the antennas or to adjust receipt of signals received via the antennas.

The apparatus 300 in some embodiments further includes one or more image sensors 310. In some embodiments, the image sensors 310 include one or more cameras that capture images, videos, and/or the like surrounding the head mounted display. For example, in some embodiments, the image sensors 310 includes cameras that face outward from the apparatus 300, for example to the sides, above, below, and/or forward from an axis relatively normal to a wearer's eyes. In some embodiments, the image sensors 310 includes cameras that face inward from the apparatus 300, for example towards the eyes of a wearer. The image sensors 310 may be processed to detect objects in the environment of the apparatus 300 (e.g., hands, eyes, operator controls, and the like) that are associated with interacting with a virtual environment and/or depicting virtual elements in the virtual environment.

The apparatus 300 in some embodiments further includes one or more orientation sensors 312. In some embodiments, the orientation sensors 312 include one or more devices that are specially configured to measure orientation and/or position data associated with the apparatus 300. In some embodiments, the orientation sensors 312 includes at least one gyroscope, accelerometer, magnetometer, LiDAR sensor, inertial measurement unit (IMU), and/or the like. In some embodiments, the one or more orientation sensors 312 includes one or more image sensors, for example of the image sensors 310, where orientation and/or position is determined from captured image data. The orientation sensors may detect and/or measure changes in rotation and/or position of the apparatus 300. For example, the orientation sensors 312 may measure data indicating the orientation and/or position of the apparatus 300 as the head mounted display is repositioned via a test stand.

The apparatus 300 in some embodiments further includes one or more motion sensors 314. In some embodiments, the motion sensors 314 include a vibration motion sensor, a passive infrared sensor, a hybrid type sensor, and/or the like that detects movement and/or reorientation of the apparatus 300. In some embodiments, the motion sensors 314 include one or more of the orientation sensors 312. In some other embodiments, the motion sensors 314 include one or more of the image sensors 310, for example where motion is detected from captured image data.

In some embodiments, one or more of the circuitries of apparatus 300 is combined into a single module configured to perform some, or all, of the actions described with respect to the individual circuitry. For example, in some embodiments, the processor 302 is combined with one or more of the other circuitry components of the apparatus 300.

Figure 3B:
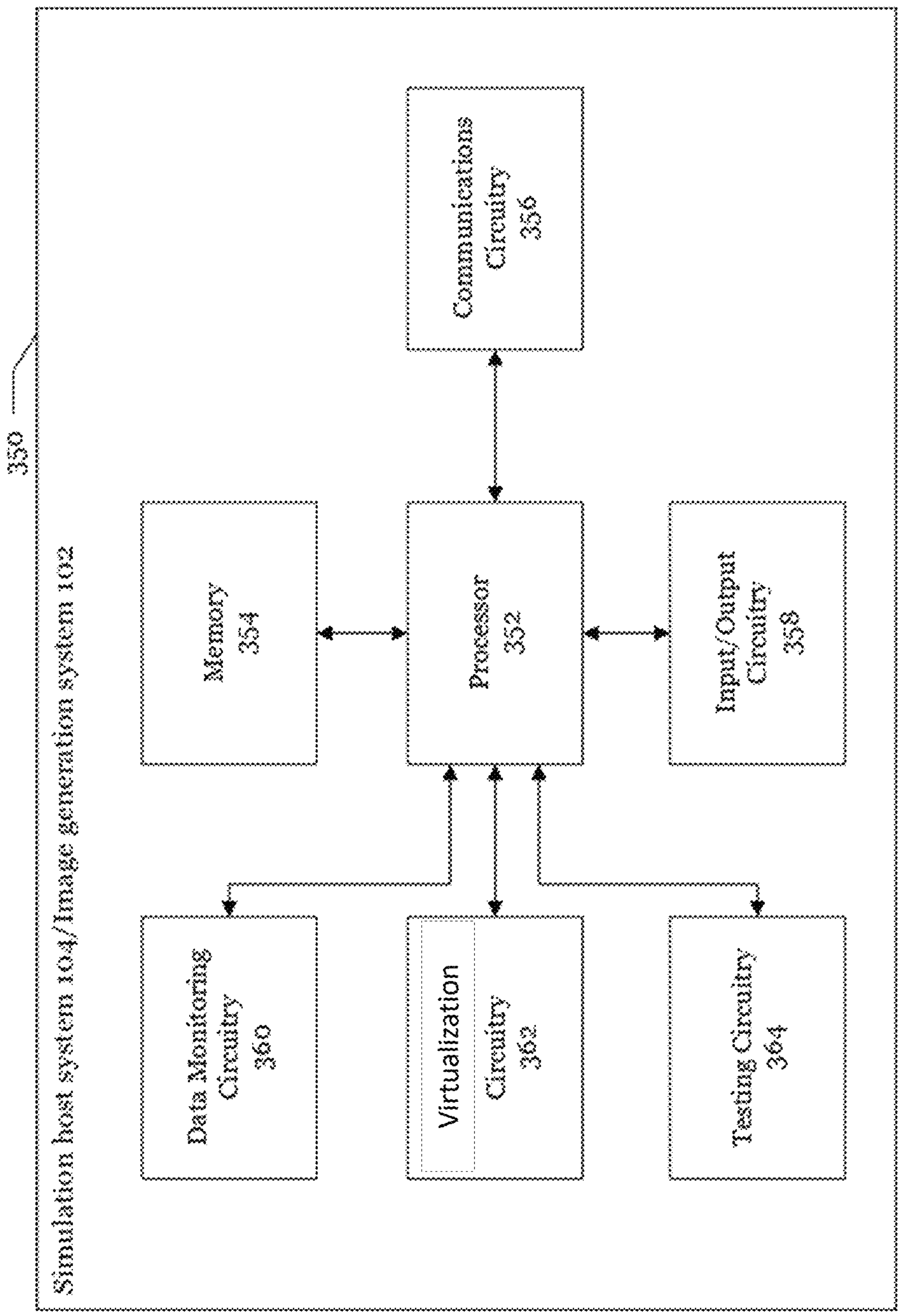
FIG. 3B illustrates a block diagram of an example apparatus in accordance with at least one aspect of the disclosure.

FIG. 3B illustrates a block diagram of an example apparatus in accordance with at least one aspect of the disclosure. Specifically, FIG. 3B depicts an example apparatus 350 embodying an example implementation of the simulation host system 104 and/or image generation system 102. The apparatus 350 includes a processor 352, a memory 354, a communications circuitry 356, an input/output circuitry 358, data monitoring circuitry 360, virtualization circuitry 362, and testing circuitry 364. The apparatus 350 may be configured, using one or more of the circuitry depicted, to execute the operations described herein.

An apparatus 350 may include one or more processors 352 and one or more computer readable medium (such as memory 354) storing computer code thereon. References to computer-readable storage medium, computer program product, tangibly embodied computer program, or the like, or a controller, monitor, monitoring system, computer, processor, or the like should be understood to encompass not only computers having different architectures such as single or multi-processor architectures and sequential (Von Neumann) or parallel architectures but also specialized circuits such as field-programmable gate arrays (FPGAs), application specific circuits (ASICs), signal processing devices and other devices. References to computer program, instructions, code, or the like, should be understood to encompass software for a programmable processor or firmware such as, for example, the programmable content of a hardware device whether instructions for a processor, or configuration settings for a fixed-function device, gate array or programmable logic device, or the like.

The apparatus 350 may have at least one processor 352 and at least one memory 354, such as a non-transitory computer readable medium, and may include computer program code, that is configured to, with the at least one processor, perform the method described herein. The memory 354 may be a single component or it may be implemented as one or more separate components some or all of which may be integrated or removable and may provide permanent, semi-permanent, dynamic, or cached storage.

The one or more processors 352 are configured to read from and write to the at least one memory 354. The processor may also comprise a bus or an output interface via which data or commands are output by the processor 352 and an input interface via which data or commands are input to the processor 352. The memory 354 stores a computer program including computer program instructions that control the operation of apparatus 350, when loaded into the processor. The computer program instructions provide the logic and routines that enable the apparatus to perform the HMD virtualization in real time and/or track body part latency. The processor 352, by reading the memory 354, is able to load and execute the computer program. The computer program or programs may arrive at the apparatus via any suitable delivery mechanism. The delivery mechanism may be, for example, a computer-readable storage medium, a computer program product, a memory device, a record medium such as a compact disc read on only memory (CD-ROM), digital versatile disc (DVD), portable memory such as a memory stick or hard drive, or the like, an article of manufacture that tangibly embodies the computer program. In some embodiments, the delivery mechanism may be a signal configured to reliably transfer the computer program over the air or via an electrical connection.

Although the components are described with respect to functional limitations, it should be understood that the particular implementations necessarily include the use of particular hardware. It should also be understood that certain components described herein may include similar or common hardware. For example, two sets of circuitry and/or modules may both leverage use of the same processor, network interface, storage medium, or the like to perform their associated functions, such that duplicate hardware is not required for each set of circuitry. The use of the term "module" and/or the term "circuitry" as used herein with respect to components of the apparatus 350 should therefore be understood to include particular hardware configured to perform the functions associated with the particular sets of circuitries as described herein.

Additionally or alternatively, the terms "circuitry" and "module" should be understood broadly to include hardware and, in some embodiments, software and/or firmware for configuring the hardware. For example, in some embodiments "circuitry" and "module" may include processing circuitry, non-transitory storage media, network interfaces, input/output devices, and/or the like. In some embodiments, other elements of the apparatus 300 may provide or supplement the functionality of the particular set of circuitry. The processor 352 may provide processing functionality, the memory 354 may provide processing functionality, the memory 354 may provide storage functionality, the communications circuitry 356 may provide network interface functionality, and the like.

In some embodiments, the processor 352 (and/or processor or any other processing circuitry assisting or otherwise associated with the processor) may be in communication with the memory 354 via a bus for passing information among components of the apparatus 350. The memory 304 may be non-transitory and may include, for example, one or more volatile and/or non-volatile memories. In other words, for example, the memory may be an electronic storage device (e.g., a computer readable storage medium). The memory 354 may be configured to store information, data, content, applications, instructions, or the like, for enabling the apparatus 350 to carry out various functions in accordance with example embodiments of the present disclosure.

The processor 352 may be embodied in any one or more of a myriad of ways and may, for example, include one or more processing devices configured to perform independently. Additionally or alternatively, the processor 352 may include one or more processors configured in tandem via a bus to enable independent execution of instructions, pipelining, and/or multithreading. The use of the terms "processor," "processing module," and "processing circuitry" may be understood to include a single-core processor, a multi-core processor, multiple processors internal to the apparatus, field-programmable gate arrays (FPGAs), graphic processing units (GPUs), application specific integrated circuits (ASICs), and/or remote and/or "cloud" processors.

In an example embodiment, the processor 352 may be configured to execute computer-coded instructions stored in the memory 354 or otherwise accessible to the processor. Alternatively, or additionally, the processor 352 may be configured to execute hard-coded functionality. As such, whether configured by hardware or software methods, or by a combination thereof, the processor 352 may represent an entity (e.g., physically embodied in circuitry) capable of performing operations according to an embodiment of the present disclosure while configured accordingly. Alternatively, as another example, when the processor is embodied as an executor of software instructions, the instructions may specially configure the processor to perform the algorithms and/or operations described herein when the instructions are executed.

As one example context, the processor 352 may be configured to generate a virtual environment and/or a particular virtual viewpoint thereof. Additionally or alternatively, in some embodiments, the processor 352 may be configured to request and/or receive data from one or more other devices, for example positioning information from a motion cueing system, body part trackers, and/or HMD spatial position data from an HMD. Additionally or alternatively, in some embodiments, the processor 352 may be configured to generate virtual adjustment information. Additionally or alternatively, in some embodiments, the processor 352 may be configured to record reference data of at least one shape in a virtual viewpoint of a virtual environment. Additionally or alternatively, in some embodiments, the processor 352 may be configured to generate at least one positional displacement vector and/or at least one orientation displacement angle. Additionally or alternatively, in some embodiments, the processor 352 may be configured to detect a test completion trigger. Additionally or alternatively, in some embodiments, the processor 352 may be configured to determine at least one error based on the at least one positional displacement vector and/or at least one orientation displacement angle. Additionally or alternatively, in some embodiments, the processor 352 may be configured to determine a test result based on one or more errors. Additionally or alternatively, in some embodiments, the processor 352 may be configured to output a test result to one or more displays.

In some embodiments, the processor 352 may be configured to receive data, signaling or information from tracking sensors that record and/or provide data or information regarding the position of body parts in real time. In some embodiments, the processor 352 may further communicate with hardware and/or execute software to render virtual representations of body parts in real time. In the context of this disclosure, body parts may include any portion of a user's body, including, but not limited to, feet, legs, hands, arms, fingers, torso, and head. In some embodiments, the processor 352, may also facilitate proximity detection capabilities for real world and/or virtual representations of body parts within threshold ranges of real world and/or virtual objects. For example, the processor 352 may process data or information when a virtual representation of a user's hand is within a threshold distance from a virtual point corresponding to a real-world object such as a button or the like, and facilitate data, information, or signaling in response.

In some embodiments, the apparatus 350 may include input/output circuitry 358 that may, in turn, be in communication with processor 352 to provide output to the user and in some embodiments, to receive an indication of one or more user inputs. The input/output circuitry 358 may comprise a user interface and may include a display (e.g., for rendering one or more user interfaces, such as to the display). The user interfaces comprise a web user interface, customized device application, native device interface, a mobile and/or desktop application, or in some embodiments includes a client device linked or otherwise networked to an associated system configuring the virtual environment. In some embodiments, the input/output circuitry 358 may also include gesture controls, soft keys, buttons, a microphone, a speaker, touch areas, and/or other input/output mechanisms. The processor, such as the processor 352, and/or the user interface circuitry comprising the processor, for example processor 352, may be configured to control one or more functions of one or more user interface elements through computer program instructions (e.g., software and/or firmware) stored on a memory accessible to the processor 352 (e.g., via memory 354, and/or the like).

The communications circuitry 356 may be any means, including for example and without limitation a device or circuitry embodied in hardware, software, firmware, and/or any combination thereof, which is configured to receive and/or transmit data from and/or to a network and/or any other device, circuitry, or module in communication with the apparatus 350. In this regard, the communications circuitry 356 may include, for example, a network interface for enabling communications with a wired or wireless communications network. For example, the communications circuitry 356 may include one or more network interface cards, antennas, buses, switches, routers, modems, and supporting hardware and/or software, or any other device suitable for enabling communications via a network. Additionally or alternatively, in some embodiments the communication interface may include the circuitry for interacting with the antennas to cause transmission of signals via the antennas or to adjust receipt of signals received via the antennas.

The apparatus 350 in some embodiments further includes the data monitoring circuitry 360. In some embodiments, the data monitoring circuitry 360 is configured to communicate with one or more devices to receive data for processing. For example, in some embodiments, the data monitoring circuitry 360 is configured to receive positioning information from a motion cueing system, where the positioning information includes one or more portions associated with one or more times. Additionally or alternatively, in some embodiments, the data monitoring circuitry 360 is configured to receive HMD spatial position data associated with an HMD from the HMD and/or one or more sensors thereof. The data monitoring circuitry 360 may continuously communicate with one or more of such devices.

The apparatus 350 in some embodiments further includes virtualization circuitry 362. In some embodiments, the virtualization circuitry 362 is configured to generate and/or configure a virtual environment, and/or one or more virtual elements therein. For example, in some embodiments the virtualization circuitry 362 generates a virtual environment that includes at least a first shape and a second shape. In some embodiments, the virtualization circuitry 362 configures at least a first shape and a second shape for depicting within a virtual viewpoint of the virtual environment. Additionally or alternatively, in some embodiments, the virtualization circuitry 362 is configured to generate virtual adjustment information, and/or apply the virtual adjustment information to a virtual model within a virtual environment for outputting.

The apparatus 350 in some embodiments further includes testing circuitry 364 and/or software. In some embodiments, the testing circuitry 364 and/or software is configured to detect a test completion trigger that indicates a request to generate a test result for a testing procedure. In some embodiments, the testing circuitry 364 and/or software records reference data associated with one or more shapes. In some embodiments, the testing circuitry 364 and/or software generates at least one positional displacement vector and/or at least one orientation displacement angle. In some embodiments, the testing circuitry 364 and or software determines at least one error based on at least one positional displacement vector and/or at least one orientation displacement. In some embodiments, the testing circuitry 364 determines a test result based on at least one error, for example an HMD orientation tracking error and/or an HMD movement tracking error. In some embodiments, the testing circuity 364 may generate signaling, data, or information when a virtual representation of a user's hand is within a threshold distance from a virtual point corresponding to a real-world object such as a button or the like. In some embodiments, the testing circuitry 364 may include contact sensors and generate data, signaling, or information related to the status of the contact sensors.

In some embodiments, one or more of the circuitries of apparatus 350 is combined into a single module configured to perform some, or all, of the actions described with respect to the individual circuitry. For example, in some embodiments, the processor 352 is combined with one or more of the other circuitry components of the apparatus 350. In some embodiments "circuitry" may be embodied in software, or the like.

Example virtual elements of virtual environments simulated in accordance with embodiments of the present disclosure are further provided. In some embodiments, the virtual elements as depicted and discussed are generated and/or maintained by one or more systems and/or devices of the system 100. For example, in some embodiments, the simulation host system 104 and/or the image generation system 102 are configured to generate, render, and/or otherwise process data associated with the virtual elements as depicted and described herein. The virtual elements may be used in one or more processes for measuring body part tracking delay, testing body part tracking delay, and/or the like as described herein.

Figure 4A:
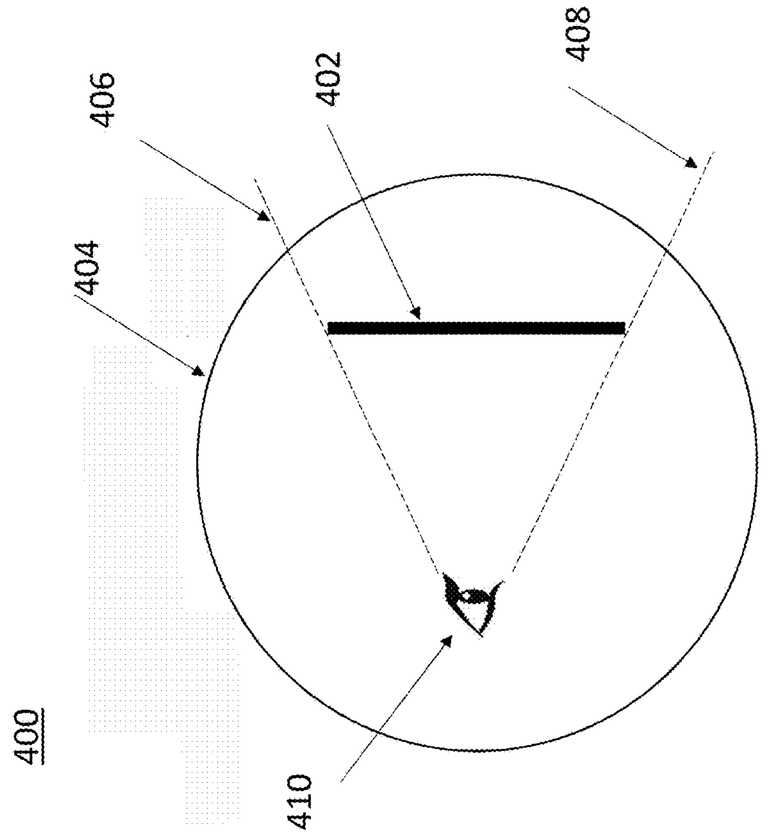
FIGS. 4A and 4B illustrates virtual environments in accordance with at least one aspect of the disclosure.
Figure 4B:
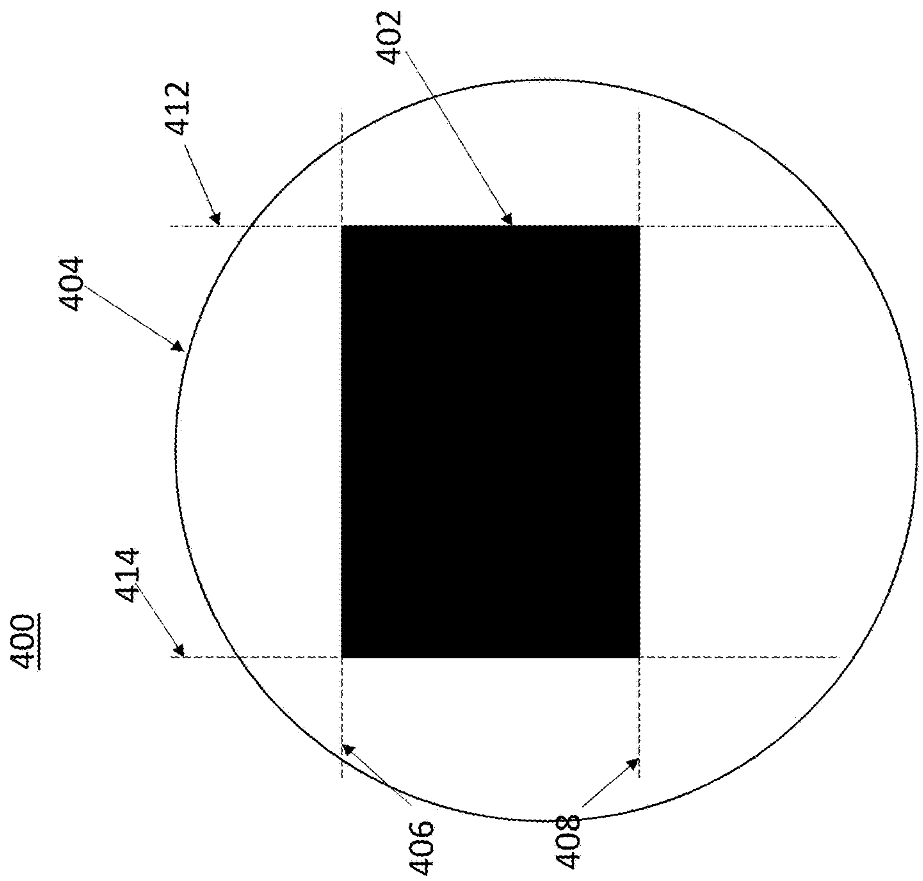

FIGS. 4A and 4B illustrate a depiction of example shapes in accordance with at least one aspect of the disclosure. Specifically, FIG. 4A depicts a first shape 402 and a second shape 404 from a first inward looking view of the virtual environment 400 to the side of a virtual viewpoint 410. FIG. 4B depicts the first shape 402 and the second shape 404 from a second inward looking view of the virtual environment 400 from behind a user's perspective (not shown here). The first shape 402 and the second shape 404 embody virtual elements that are renderable within a virtual environment. In essence, the first shape 402 is suspended in front of a portion of the second shape 404. Accordingly, a portion the HMD display(s) may show the color of the first shape 402 when the virtual viewpoint is directed towards a field of view comprising the first shape 402. The remainder of the HMD display(s) will be the color of the second shape 404, or all in the case where the virtual viewpoint 410 is not directed towards the first shape 402 at all.

As illustrated, the second shape 404 includes a spherical shape form that surrounds the virtual viewpoint 410 in the virtual environment 400. The inner surface of the second shape 404 may be white in some embodiments. In some embodiments, the inner surface of the second shape 404 may be a color having a luminance greater than a first threshold when rendered on the HMD viewing screen.

The first shape 402 is a shape that will precisely fill the virtual field of view when the HMD is stationary (i.e., affixed to the test stand with the test stand locked in place). For example, as illustrated the first shape 402 is a flat two-dimensional (2D) wall that extends from a top edge of the virtual point of view 406 to a bottom of the virtual point of view 408, and is located between the virtual viewpoint 410 and the second shape 404 in the virtual environment 400. As shown in FIG. 4B, the first shape 402 also extends from the right edge of the virtual point of view 412 to the left edge of the virtual point of view 414. Additionally or alternatively, in some embodiments the first shape 402 may be rendered as a curved or three-dimensional (3D).

In some embodiments, the first shape 402 and the second shape 404 are configured such that while the test stand, and accordingly the mounted HMD, are in a fixed position, first shape 402 only is visible in the HMD, and second shape 404 is completely hidden behind first shape 402 in the virtual environment 400. Accordingly, the HMD screen will be completely the color and associated luminance of the first shape 402. In some embodiments, the HMD screen will be completely black when stationary. In some embodiments, the first shape will have a luminance greater than 30000 candela per square meter (cd/m$^2$) when a first color of the first shape is displayed in the HMD. In some embodiments, the first shape will have a luminance less than 1000 candela per square meter (cd/m$^2$) when a second color of the first shape is displayed in the HMD.

In some embodiments, a virtual viewpoint of a virtual environment is configured to adjust in response to one or more inputs. For example, in some embodiments a virtual viewpoint is updated in response to movements of a HMD, such as via movement and/or rotation. In one context, the virtual viewpoint of the virtual environment may similarly be rotated in an upwards direction within the virtual environment. Accordingly, in some embodiments, the HMD can then effectively "look over" the first shape 402 to see portions of the second shape 404. Portions of the HMD display may then be the color of second shape 404, as the field of view now encompasses portions of the second shape, and a luminance change of the HMD display may occur. In some embodiments, the first shape 402 and the second shape 404 are configured to be affixed in the virtual environment 400. In some embodiments, a shape's color may be changed or a shape removed to change the luminance of the HMD display based on one or more real world or virtual environment criteria. For the purposes of testing a body part tracking delay within the content of this disclosure, the HMD and the test stand should remain affixed in a single position while testing is taking place to avoid invalidating the testing.

Figure 5:
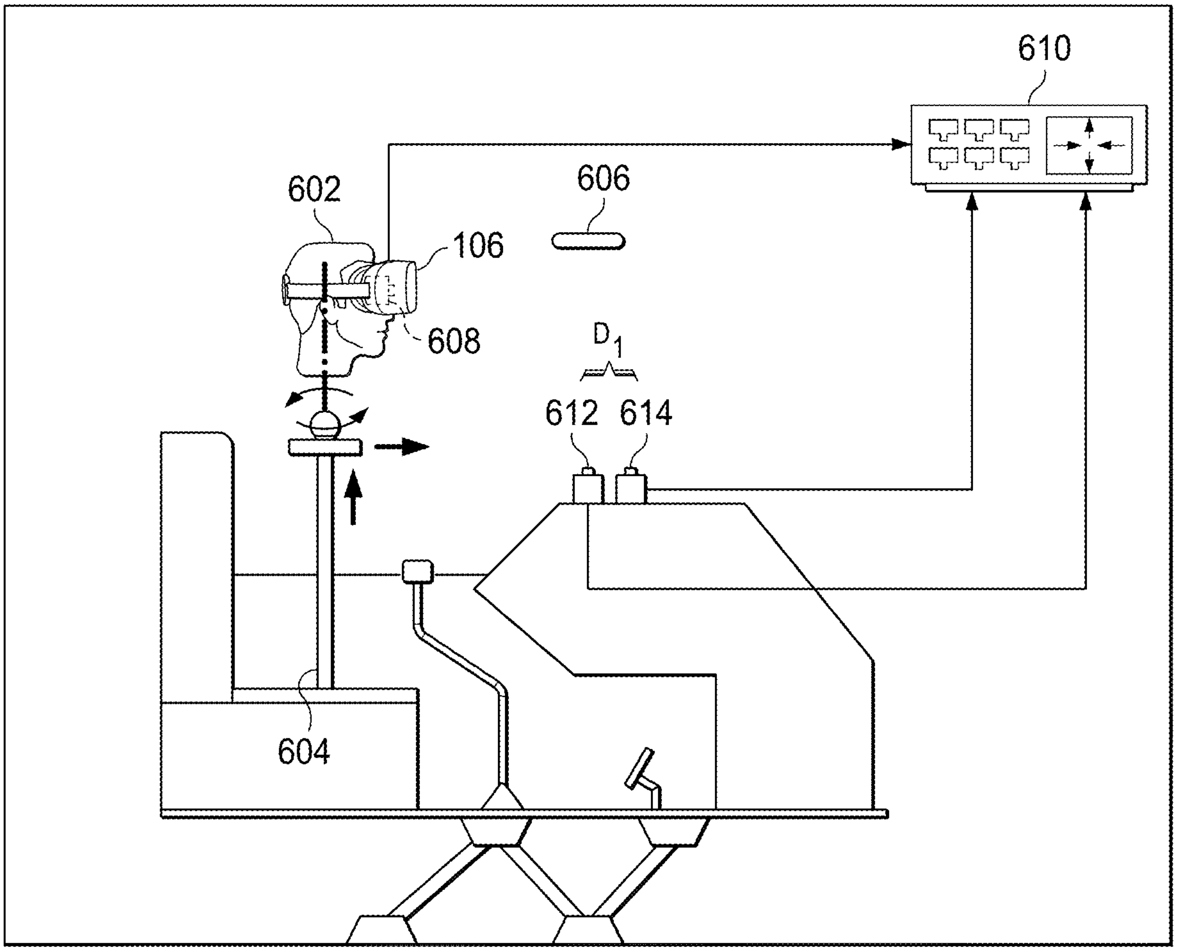
FIG. 5 illustrates a depiction of testing setup in accordance with at least one aspect of the disclosure.
Figure 6:
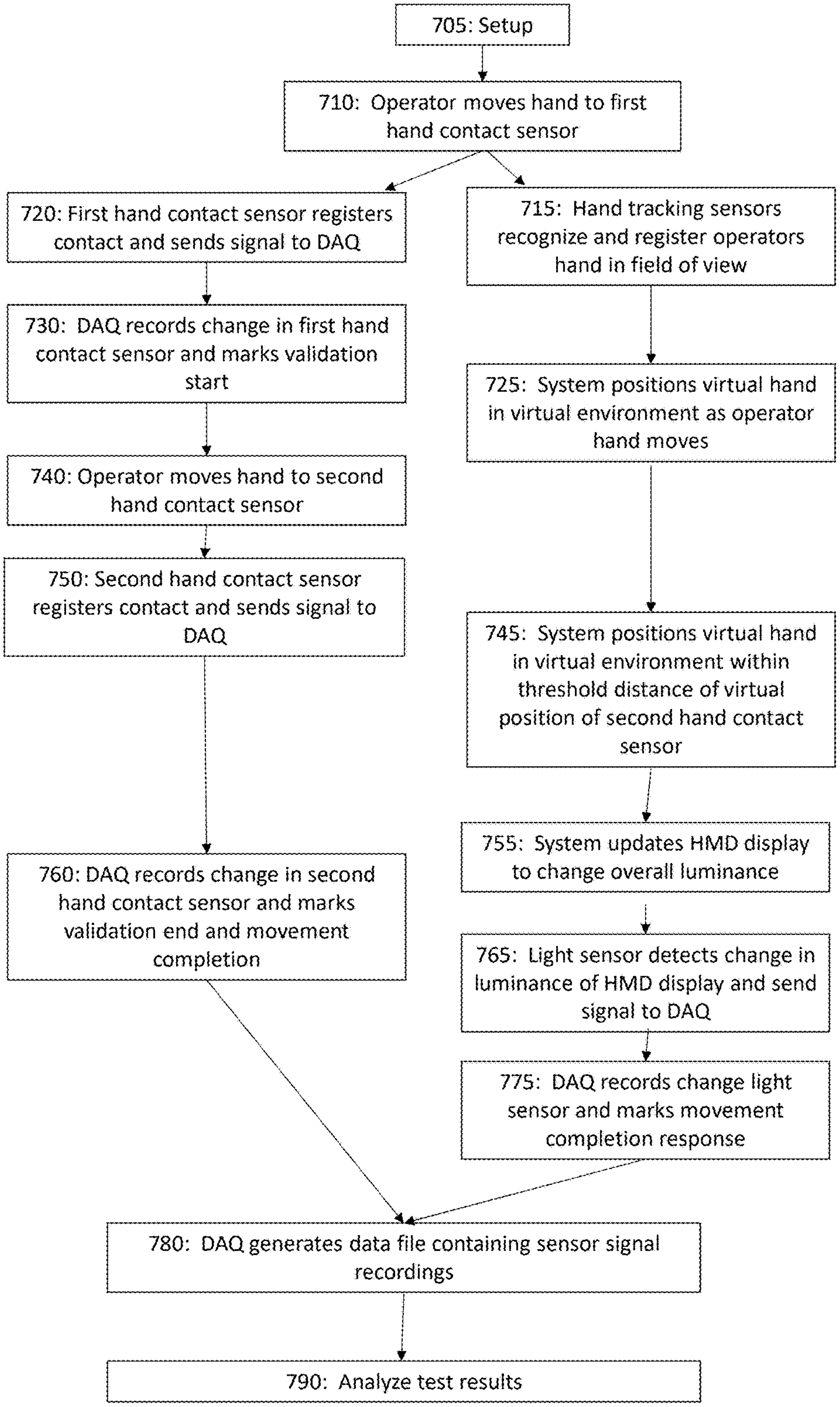
FIG. 6 is a flowchart depicting operations of an example process for measuring the signal time delay between movement of an operator hand and corresponding movement of a virtual model within a virtual scene, in accordance with at least one aspect of the disclosure.

FIG. 5 is a setup for measuring signal time delay between movement of a user's physical hand and corresponding movement of the virtual hand within a virtual scene, according to some embodiments. In some embodiments the HMD 106 is mounted on a model head 602 mounted to a test stand 604. The test stand 604 is individually adjustable and lockable in all six degrees of freedom (surge, sway, heave, roll, pitch, yaw). The test stand 604 allows the model head 602 to be manually adjusted in any given degree of freedom. However, for the purpose of testing signal tie delay of movement of a user's physical hand in a virtual environment, the test stand should be locked in place to prevent movement in all degrees of freedom. A light sensor 608 is imbedded within the model head 602 at a model eye point. Two hand contact sensors 612 and 614 may be located within the view of the HMD 106. The hand contact sensors 612 and 614 may be located at a set distance apart ($D_1$). In some embodiments the set distance apart ($D_1$) is one foot. Both the light sensor 608 and hand contact sensors 612 and 614 transmit signals to a high-rate data acquisition system (DAQ) 610. The DAQ 610 is capable of simultaneously recording both signals from the light sensor 608 and hand contact sensors 612 and 614, and generating a data file for analysis.

Light sensor 608 may be a photocell, also known as a photoresistor or light-dependent resistor (LDR), according to some embodiments. A LDR is an electronic component that changes its resistance based on the amount of light it receives. Made from a semiconductor material, typically cadmium sulfide (CdS), the photocell has a resistance that decreases as the intensity of light increases. When exposed to darkness or low light levels, the resistance of the photocell is high, restricting the flow of electrical current. Conversely, in bright light, its resistance drops, allowing more current to pass through. In some embodiments, the light sensor 608 may be a photodiode or phototransistor. Photodiodes and phototransistors are types of photocells that respond to light by generating a small electrical current. Photodiodes and phototransistors are faster and more sensitive than LDRs, making them ideal for high-speed or low-light applications, and may be selected based on the luminance difference expected to be generated by the HMD 106, and the expected delay times being measured.

Hand contact sensors 612 and 614 are electronic devices that detect physical contact or proximity, converting this interaction into an electrical signal for further processing. Contact sensor works by detecting changes in capacitance, resistance, or pressure when a user touches or comes close to the sensor surface. For instance, in a capacitive touch sensor, the human finger's natural conductivity alters the electrical field, which is then detected and interpreted by the device as a touch event. Hand contact sensors 612 and 614 may be capacitive, resistive, surface acoustic wave, infrared, and/or optical touch sensors.

DAQ 610 may include a processor, a memory, communications circuitry, and/or input/output (I/O) circuitry.

References to computer-readable storage medium, computer program product, tangibly embodied computer program, or the like, or a controller, monitor, monitoring system, computer, processor, or the like should be understood to encompass not only computers having different architectures such as single or multi-processor architectures and sequential (Von Neumann) or parallel architectures but also specialized circuits such as field-programmable gate arrays (FPGAs), application specific circuits (ASICs), signal processing devices and other devices. References to computer program, instructions, code, or the like, should be understood to encompass software for a programmable processor or firmware such as, for example, the programmable content of a hardware device whether instructions for a processor, or configuration settings for a fixed-function device, gate array or programmable logic device, or the like.

The DAQ 610 may have at least one processor and at least one memory, such as a non-transitory computer readable medium, and may include computer program code, that is configured to, with the at least one processor, perform the method described herein. The memory may be a single component or it may be implemented as one or more separate components some or all of which may be integrated or removable and may provide permanent, semi-permanent, dynamic, or cached storage.

The one or more processors are configured to read from and write to the at least one memory. The processor may also comprise a bus or an output interface via which data or commands are output by the processor and an input interface via which data or commands are input to the processor. The memory stores a computer program including computer program instructions that control the operation of controller, when loaded into the processor. The computer program instructions provide the logic and routines that enable the apparatus to perform the HMD virtualization in real time and/or track body part latency. The processor, by reading the memory, is able to load and execute the computer program. The computer program or programs may arrive at the apparatus via any suitable delivery mechanism. The delivery mechanism may be, for example, a computer-readable storage medium, a computer program product, a memory device, a record medium such as a compact disc read on only memory (CD-ROM), digital versatile disc (DVD), portable memory such as a memory stick or hard drive, or the like, an article of manufacture that tangibly embodies the computer program. In some embodiments, the delivery mechanism may be a signal configured to reliably transfer the computer program over the air or via an electrical connection.

Although the components are described with respect to functional limitations, it should be understood that the particular implementations necessarily include the use of particular hardware. It should also be understood that certain components described herein may include similar or common hardware. For example, two sets of circuitry and/or modules may both leverage use of the same processor, network interface, storage medium, or the like to perform their associated functions, such that duplicate hardware is not required for each set of circuitries. The use of the term "module" and/or the term "circuitry" as used herein with respect to components of the DAQ 610 should therefore be understood to include particular hardware configured to perform the functions associated with the particular sets of circuitries as described herein.

Additionally or alternatively, the terms "circuitry" and "module" should be understood broadly to include hardware and, in some embodiments, software and/or firmware for configuring the hardware. For example, in some embodiments "circuitry" and "module" may include processing circuitry, non-transitory storage media, network interfaces, input/output devices, and/or the like. In some embodiments, other elements of the DAQ 610 may provide or supplement the functionality of the particular set of circuitries. The processor may provide processing functionality, the memory may provide storage functionality, the communications circuitry may provide network interface functionality, signaling input/output, and the like.

In some embodiments, the processor (and/or processor or any other processing circuitry assisting or otherwise associated with the processor) may be in communication with the memory via a bus for passing information among components of the DAQ 610. The memory may be non-transitory and may include, for example, one or more volatile and/or non-volatile memories. In other words, for example, the memory may be an electronic storage device (e.g., a computer readable storage medium). The memory may be configured to store information, data, content, applications, instructions, or the like, for enabling the DAQ 610 to carry out various functions in accordance with example embodiments of the present disclosure.

The processor may be embodied in any one or more of a myriad of ways and may, for example, include one or more processing devices configured to perform independently. Additionally or alternatively, the processor may include one or more processors configured in tandem via a bus to enable independent execution of instructions, pipelining, and/or multithreading. The use of the terms "processor," "processing module," and "processing circuitry" may be understood to include a single-core processor, a multi-core processor, multiple processors internal to the apparatus, field-programmable gate arrays (FPGAs), graphic processing units (GPUs), application specific integrated circuits (ASICs), and/or remote and/or "cloud" processors.

In an example embodiment, the processor may be configured to execute computer-coded instructions stored in the memory or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specially configure the processor to perform the algorithm(s) and/or operations described herein when the instructions are executed.

In some embodiments, the DAQ 610 may be configured to record, measure, and/or provide data associated with light sensor 608 and hand contact sensors 612 and 614. In some embodiments, the DAQ is configured to sample the signal from the light sensor 608 at a first sample rate. In some embodiments, the DAQ is configured to sample the signal from the hand contact sensors 612 and 614 at a second sample rate. In some embodiments the first sample rate and the second sample rate frequency are the same. In some embodiments the first sample rate and the second sample rate are between 10 to 100,000 Hz, such as 2000 Hz.

In some embodiments, the DAQ 610 may include an input/output module that may, in turn, be in communication with the processor, light sensor 608, and hand contact sensors 612 and 614 to provide output to a user or secondary system; and in some embodiments, to receive an indication of one or more user input(s). The input/output module may comprise a user interface and may include a display (e.g., for rendering one or more user interfaces, such as to the display) for accessing and viewing the data file generated as a result of testing. The user interfaces comprise a web user interface, customized device application, native device interface, a mobile and/or desktop application, or in some embodiments includes a client device linked or otherwise networked to an associated system configuring the virtual environment. In some embodiments, the input/output module may also include gesture controls, soft keys, buttons, a microphone, a speaker, touch areas, and/or other input/output mechanisms. The processor, such as the processor, and/or the user interface circuitry comprising the processor, for example processor, may be configured to control one or more functions of one or more user interface elements through computer program instructions (e.g., software and/or firmware) stored on a memory accessible to the processor (e.g., via memory, and/or the like).

The communications circuitry may be any means, including for example and without limitation a device or circuitry embodied in hardware, software, firmware, and/or any combination thereof, which is configured to receive and/or transmit data and/or signaling from and/or to a network and/or any other device, circuitry, or module in communication with the DAQ 610. In this regard, the communications circuitry may include, for example, a network interface for enabling communications with a wired or wireless communications network. For example, the communications circuitry may include one or more network interface card(s), antenna(s), buses, switches, routers, modems, and supporting hardware and/or software, or any other device suitable for enabling communications via a network. Additionally or alternatively, in some embodiments the communication interface may include the circuitry for interacting with the antenna(s) to cause transmission of signals via the antenna(s) or to adjust receipt of signals received via the antenna(s).

In some embodiments, one or more of the circuitries of DAQ 610 is combined into a single module configured to perform some, or all, of the actions described with respect to the individual circuitry. For example, in some embodiments, the processor may be combined with one or more of the other circuitry components of the DAQ 610.

In some embodiments, there may be a separate body part tracking sensor 606. Body part tracking in virtual reality (VR) is a technology that allows users to interact with virtual environments using, for example, their hands as input devices, without the need for traditional controllers. Through the use of cameras and sensors, the system detects and captures the precise movements of the user's hands and fingers in real-time. This data is then processed to create a digital representation of the hands within the virtual space. Body part tracking sensors 606 typically involves the use of infrared cameras or depth sensors, which track the position, orientation, and gestures of the hands. Algorithms interpret these movements, allowing users to perform actions like grabbing objects, pressing buttons, or even complex gestures like pinching or pointing within the VR environment. Body part tracking enhances the sense of immersion, making interactions more natural and intuitive, as it closely mirrors how people interact with the real world. In some embodiments, the body part tracking sensors 606 are separate sensors installed in the simulation enclosure or cockpit. Alternatively or additionally, body part tracking sensors 606 may be installed in the HMD 106.

As part of the testing, an image of a virtual environment is generated and displayed within the HMD 106. In some embodiments, the virtual environment consists of the first test shape and the second test shape. A second shape may be a white sphere and may be generated and centered on the virtual viewpoint, surrounding the virtual viewpoint. A first shape such as a black, 2D surface may be generated within the sphere, directly in front of the virtual viewpoint. The black surface of the first test shape may be shaped and positioned to exactly fill the virtual field of view. Accordingly, at the beginning of the test, the HMD 106 display may be completely dark (black).

The first hand contact sensor 612 may be placed at a designated reference point approximately arm's length from the HMD 106. The second hand contact sensor 614 may be placed at a set distance ($D_1$) from the first hand contact sensor 612. In some embodiments, the second hand contact sensor 614 is positioned one foot from the first hand contact sensor 612 ($D_1$=1 foot).

At the beginning of a test, both hand contact sensors 612 and 614 register no contact and continuously send a corresponding signal to the DAQ 610. The light sensor 608 will register a first luminance of the HMD 106 related to a first color of the first shape. In some embodiments, the first color of the first shape may be black, and the light sensor 608 will register a low luminance. In some embodiments, the low luminance may be less than 1000 candela per square meter (cd/$m^2$).

To begin a test capture, a human test operator may position himself/herself behind or to the side of the test stand 604 and model head 602. The human test operator may then reach their hand in front of the HMD, approximately mimicking a user, and touch the first hand contact sensor 612. The first hand contact sensor 612 registers the contact and alters the signal to the DAQ 610 accordingly. The DAQ 610 may then record the change in and/or signal from the first hand contact sensor and mark the transition as test validation start.

The test operator then moves his or her hand and touches the second hand contact sensor 614 with the same hand. The second hand contact sensor 614 registers the contact and alters the signal and/or sends a signal to the DAQ 610 accordingly. The DAQ 610 records the change in and/or signal from hand contact sensor 614 and marks the transition as test validation end and/or movement completion.

Additionally, one or more body part tracking sensors 606 also register the test operator hand movement. The body part tracking sensors 606 send a signal containing this data related to the operator's hand movement to the image generation system 102. HMD 106 and/or system 100 software then converts the data related to the operator's hand movement into a new real-world spatial position of the hand and sends that information to the virtual environment generating software. The virtual environment generating software adjusts the spatial position of the virtual hand within the virtual environment. When the spatial position of the virtual hand approaches the virtual reference point within a threshold minimum distance, the virtual environment generating software changes the virtual environment. In some embodiments, the virtual environment generating software may change the color of the first shape from the first color (e.g., black), having a first luminance (e.g., low or less than 1000 candela per square meter ($cd/m^2$)) to a second color having a second luminance (e.g., high or greater than 30000 candela per square meter ($cd/m^2$)). In some embodiments, the virtual environment generating software may remove, delete, or move the position of the first shape such that the first shape no longer fills the HMD 106 field of view, and only the second shape may be "seen" or rendered.

The virtual environment generating software sends the updated virtual image back to the HMD 106 software. The HMD 106 software populates the updated virtual image on the HMD 106 screens, changing pixels from the first color (e.g., black) to the second color (e.g., white). The light sensor 608 registers the change in luminance caused by the second color being rendered on the HMD 106 displays and alters the signal to the DAQ 610 accordingly. The DAQ 610 records the change in and/or receipt of the light sensor 608 signal and marks the transition as movement completion response.

In some embodiments, the movement of the operator's hand between the first hand contact sensor 612 and the second hand contact sensor 614 may need to be above a minimum threshold speed ($S_{min}$) and below a maximum threshold speed ($S_{max}$).

The DAQ 610 outputs a data file containing the sensor signals recorded at a high rate and the data may then be analyzed. The speed of the operator's hand movement may be calculated by determining the difference in time between the operator contacting the first hand contact sensor 612 (marked as test validation start) and the operator contacting the second hand contact sensor 614 (marked as test validation end). If the operator's hand speed is too low, demand on the body part tracking system may not be sufficient to evaluate operational performance. Additionally, if the operator's hand speed is too fast, the capabilities of the system may be exceeded and any measurement of body part tracking rendered invalid due to additional time necessary for the body part tracking sensors 606 to reacquire and reposition the operator's hand. Accordingly, with the known distance separating the first hand contact sensor 612 and the second hand contact sensor 614, a speed of the operator's hand movement may be calculated. If the calculated movement speed of the operator's hand ($S_h$) is less than the minimum threshold speed ($S_{min}$) ($S_h<S_{min}$) or the calculated movement speed of the operator's hand ($S_h$) is greater than the maximum threshold speed ($S_{max}$) ($S_h>S_{max}$), then the test run may be designated as invalid. If the calculated movement speed of the operator's hand ($S_h$) is greater than or equal to the minimum threshold speed ($S_{min}$) and less than or equal to the ($S_h<S_{min}$) maximum threshold speed ($S_{max}$) ($S_{min}\leq S_h\leq S_{max}$), then the test is designated as valid.

If the test is designated as valid, the time of the operator's hand contacting the second hand contact sensor 614 (marked as test validation end and/or movement completion) may be compared to the time of the light sensor 608 signal to the DAQ 610 recoding the change in luminance of the HMD 106 displays (marked as movement completion response). As stated above the change in luminance of the HMD 106 displays is due to the virtualization system registering the spatial position of the virtual hand as it approaches the virtual reference point (corresponding to the second hand contact sensor 614 position in the real world) within a threshold minimum distance. The difference in time between movement completion and movement completion response is the signal delay in representing a real-world hand movement in the virtual environment and system lag. This signal delay may be referred to as the "tracking delay." In some embodiments, a test procedure is determined to have a passed test result in a circumstance where, for any particular movement of the operator's hand, the test is determined as valid and the tracking delay is within required threshold(s). The testing may then be repeated for additional hand movements by changing the position of the first hand contact sensor 612 in the real world, and the second hand contact sensor 614 in the real world and the virtual environment.

Based on the testing described above, a less expensive and less complex test stand that does not require electrical power may be utilized saving expense of testing. Additionally, the testing requires far less expensive and easier to source sensor equipment, less complex virtual test components, less complex data analysis that does not require proprietary software, and allows for test results to be confirmed by human analysis.

FIG. 7 illustrates a flowchart depicting operations of an example process for measuring the signal time delay between movement of a user's physical hand and corresponding movement of a virtual hand within a virtual scene, in accordance with at least one aspect of the disclosure.

In block 705, the system is set up to prepare for the test. Set up includes, positioning the model head and test stand at the intended location of HMD operation. All surrounding HMD tracking sensors, including body part tracking sensors, must be installed at their intended locations or temporarily installed in a way that maintains their intended spatial relationship to the HMD. The model head is positioned on the test stand with the first hand contact sensor and second hand contact sensor in the field of view of the HMD. Movement in all six degrees of freedom is then locked. The virtual environment is generated with a second shape (e.g., a white sphere) surrounding the virtual viewpoint and a first shape (e.g., a black surface) directly in front of the virtual viewpoint, precisely filling the virtual field of view. The virtual image displayed on the HMD screens shows only the first shape (e.g., the black surface), making the screens of the HMD have a first luminance. The light sensor is aimed at the HMD screens from the model head's eye point and registers the first luminance from the HMD screens displaying the first shape only. In some embodiments the light sensor continuously sends a corresponding signal to the high-rate DAQ related to the luminance of the HMD screens. In some embodiments, the light sensor may only send a discrete signal upon change in the HMD display luminance over a threshold luminance change or upon increasing above or decreasing below a first luminance. In some embodiments, a subset of the hand contact sensors may send a continuous signal indicating no contact to the DAQ. In some embodiments, a subset of the hand contact sensors may only provide a signal to the DAQ when registering contact from an operator. In some embodiments data collection by the DAQ may be started, and a data file continuously written to with sampled light sensor and hand contact sensor data points having a time stamp associated with each sample.

In block 710, a human operator moves their hand towards the first hand contact sensor.

In block 715, after a delay from the operator moving their hand into the HMD field of view and towards the first hand contact sensor, the body part tracking sensors installed in the HMD and/or simulator environment will recognize the operator's hand and position a virtual replica of the operator's hand in the virtual environment. In some embodiments, the virtual hand may be actually rendered in the virtual environment, however, behind the second shape and/or first shape such that no actual change in the pixels is made based on the operator's hand in the HMD displays. In some embodiments, the rendering of the virtual hand may be suppressed to avoid any changes in pixels of the HMD display due to the operator's hand motion.

In block 720, separate and apart from the hand tracking in block 715, the operator's hand contacts the first hand contact sensor and the first hand contact sensor sends a signal (e.g., a discrete signal, a change in the signaling, or the like) to the DAQ indicating contact with the operator's hand. In some embodiments, block 715 may take place after block 720 depending on, for example, the delay in the system and the operator's hand movement speed.

In block 725, as the operator's hand moves in the real world, the body part trackers installed in the HMD and/or the simulator environment will update the virtual position of the virtual hand in the virtual environment. Again, this update may be located behind the first shape and second shape, or the rendering of the virtual hand may be suppressed. This block will continuously occur at least while the operator moves his or her hand within the test environment in the field of view of the HMD.

In block 730 the DAQ records the discrete signal or change in signaling from the first hand contact sensor. In some embodiments, the DAQ may mark the signal from the first hand contact sensor as validation start. In some embodiments, the signaling related to the first hand contract sensor registering the operator's contact may be marked as validation start during the analysis of the data generated by the DAQ after test completion.

In block 740, the operator moves his or her hand from the first hand contact sensor to the second hand contact sensor. The movement of the hand should be above a minimum hand speed (Smin) to be sufficient to test the operational performance of body part tracking in the system. However, the movement speed of the operator's hand needs to be below a maximum speed (Smax) to avoid exceeding operational performance expectations of body part tracking in the system. Block 725 may continue to be performed tracking the real-world position of the operator's hand and updating the virtual environment to reflect the change.

In block 750, the operator contacts his or her hand with the second hand contact sensor and the second hand contact sensor sends a signal (e.g., a discrete signal, a change in the signaling, or the like) to the DAQ indicating contact with the operator's hand. Block 725 may continue to be performed tracking the real-world position of the operator's hand and updating the virtual environment to reflect the change.

In block 745, after a delay from the operator contacting their hand with the second hand contact sensor, the system will recognize the virtual hand within a minimum threshold distance from the virtual position of the second hand contact sensor and corresponding signaling will be generated to initiate a change in the HMD display.

In block 755, based on the signaling corresponding to the virtual hand position, the system updates the HMD display to change the overall luminance of the display. In some embodiments, the change in luminance should be greater than 15,000 candela per square meter (cd/$m^2$). In some embodiments, the virtual environment generating software may change the color of the first shape from a first color of a first luminance (e.g., a black surface with a rendered luminance less than 1000 cd/$m^2$) to a second color of a second luminance (e.g., white with a rendered luminance greater than 30,000 cd/$m^2$). In some embodiments, the virtual environment generating software may remove first shape from the virtual environment or move the position of the first shape out of the field of view of the HMD such that the second shape is shown. In some embodiments the second shape is a second color having a second rendered luminance (e.g., white with a rendered luminance greater than 30,000 cd/$m^2$), and the color of the first shape is a first color having a first rendered luminance (e.g., a black surface with a rendered luminance less than 1000 cd/$m^2$). The virtual environment generating software sends the updated virtual image back to the HMD manufacturer software. The HMD manufacturer software populates the updated virtual image on the HMD screens, changing the pixels of the display from the first color to the second color (e.g., from black to white).

In block 760 the DAQ records the signaling from the second hand contact sensor. In some embodiments, the DAQ may mark the signal from the second hand contact sensor as validation end and/or movement completion. In some embodiments, the signaling related to the second hand contract sensor registering the operator's contact may be marked as validation end and/or movement completion during the analysis of the data generated by the DAQ after test completion.

In block 765, the light sensor detects the change in overall luminance of the HMD displays and alters the signal to the DAQ. In some embodiments, the light sensor signal to the DAQ may be a discrete signal when the light sensor detects the change in luminance of the HMD displays beyond a threshold amount.

In block 775, the DAQ records the change in the light sensor signal and the transition is marked as movement completion response. In some embodiments, the marking of the transition as movement completion response may be based on a threshold change in the light sensor signal. In some embodiments, the threshold change in the light sensor signal may be based on a signal-to-noise (SN) characteristic of the light sensor. In some embodiments, the marking of the transition as movement completion response may be performed during analysis after the data file is generated by the DAQ and after the test has been completed.

In block 780, the DAQ outputs a data file containing information encoding the sensor signals values sampled at a high rate. The data rate may be between 10 and 10,000 Hz. The data file may be a text document, an extensible markup language (XML) file, an EXCEL™ file, a comma separated list, a data file containing information encoding the data in proprietary or open source data structures, or any other suitable forms of storing the sampled sensor signals. In some embodiments, each sample signal has a timestamp associated with the sample for reconstruction. In some embodiments, the sampling rate may be provided in the data file.

In block 790, the data file may then be analyzed, and the time of movement initiation compared to the time of movement response. The difference in time between the DAQ recording movement completion (the sampling time of the operator's contact with the second hand contact sensor registered by the DAQ) and movement completion response (the sampling time of the light sensor signaling the change in HMD luminance registered by the DAQ) represents the signal delay in representing movement of a virtual hand in the virtual environment in relation to the real-world. The testing method can be repeated for different hand or body motions. In some embodiments, the DAQ may send the data file to the system for analysis. In some embodiments, the data file may be retrieved or sent from the DAQ and loaded into an independent computer or display terminal for analysis.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a transmission configuration determining unit/module and/or a sequence transmitting unit/module. The respective units/modules may be hardware, software, or a combination thereof. For instance, one or more of the units/modules may be an integrated circuit, such as field programmable gate arrays (FPGAs) or application-specific integrated circuits (ASICs).

In accordance with a first aspect of the disclosure, a method is provided. An example method includes generating a virtual environment of a test scenario for a head mounted display (HMD) mounted to a model head on a test stand, where the virtual environment includes at least a first shape, where the first shape is a shape that precisely fills a virtual field of view from the first virtual viewpoint, and the virtual environment is configured to replicate hand or body motion in a real-world field of view of the HMD, receiving, by a data acquisition system (DAQ), from a first hand contact sensor, signaling indicating contact by an operator's hand, receiving, by the DAQ, from a second hand contact sensor, signaling indicating contact by the operator's hand, where the second hand contact sensor is a first distance from the first hand contact sensor, tracking the operator's hand motion in the real world by one or more body part tracking sensors, updating the virtual environment based on a tracked real world position of the operator's hand motion, changing a luminance of the HMD based on the virtual environment updating the position of the operator's hand within a minimum threshold distance from a virtual representation of the second hand contact sensor, receiving, by the DAQ, from a light sensor mounted on the model head, signaling based on changing the luminance of the HMD, and generating, by the DAQ, a data file encoding the signaling from the first hand contact sensor, the second hand contact sensor, and the light sensor.

In some embodiments, the method further includes performing, before contacting the operator's hand to the first contact sensor, sampling, by the DAQ signaling from the light sensor, based on a first luminance of the HMD related to a first color of the second shape. In some embodiments, the method further includes performing, before contacting the operator's hand to the first contact sensor, sampling, by the DAQ signaling from the first hand contact sensor and the second hand contact sensor, based on no contact. In some embodiments, the method further includes marking a validation start time based on receiving, by the DAQ, signaling indicating contact of the operator's hand with the first hand contact sensor, and marking a validation end time based on receiving, by the DAQ, signaling indicating contact of the operator's hand with the second hand contact sensor. In some embodiments, the method further includes determining a difference between the validation start time and the validation end time, determining a speed of the operator's hand movement ($S_h$) between the first hand contact sensor and the second hand contact sensor based on a real-world distance between the first hand contact sensor and the second hand contact sensor, and the difference between the validation start time and the validation end time, determining the test is valid based on $S_h$ being equal to or above a minimum hand speed ($S_{min}$) and equal to or below a maximum hand speed ($S_{max}$) ($S_{min} \leq S_h \leq S_{max}$), and determining the test is not valid based on $S_h$ being one of: below the minimum hand speed ($S_h < S_{min}$); or above the maximum hand speed ($S_h > S_{max}$). In some embodiments, the method further includes marking a movement completion time based on receiving, by the DAQ, signaling indicating contact of the operator's hand with the second hand contact sensor, and marking a movement completion response time based on receiving, by the DAQ, from the light sensor mounted on the model head, changed signaling indicating the changed luminance of the HMD. In some embodiments, the method further includes determining a difference between the movement completion time and the movement completion response time, and determining a delay in representing hand movement in the virtual environment ("hand tracking delay") based on determining the difference between the movement completion time and the movement completion response time. In some embodiments, updating the virtual environment based on the tracked real world position of the operator's hand motion includes suppressing rendering of a virtual representation of the operator's hand in the HMD. In some embodiments, the first hand contact sensor and the second hand contact sensor is one of a capacitive touch sensor, a resistive touch sensor, a surface acoustic wave touch sensor, an infrared touch sensor, or an optical touch sensor. In some embodiments, the light sensor is one of a photoresistor, a light-dependent resistor (LDR), a photodiode, or a phototransistor. In some embodiments, changing the luminance of the HMD based on the virtual environment updating the position of the operator's hand within the minimum threshold distance from the virtual representation of the second hand contact sensor includes removing the first shape from the virtual environment to reveal a second shape, and a luminance of the second shape is greater than 30000 candela per square meter (cd/m$^2$) based on only the second shape being displayed in the HMD, or changing the color of the first shape to a second color, where a luminance of the second color of the first shape is greater than 30000 cd/m$^2$ based on only the second color of the first shape being displayed in the HMD. In some embodiments, a luminance of a first color of the first shape is less than 1000 cd/m$^2$ based on only the first shape being displayed in the HMD. In some embodiments, the first shape is of a first color and a second shape is of a second color, where the first color and the second color are visually distinguishable, and where a luminance difference between displaying only the first shape in the HMD and only the second shape in the HMD is greater than 15000 candela per square meter (cd/m$^2$).

In a second aspect of the disclosure an apparatus is provided. An example apparatus includes one or more processors, and at least one non-transitory computer readable memory connected to the one or more processors and including computer program code, where the at least one non-transitory computer readable memory and the computer program code are configured, with the one or more processors, to cause the apparatus to at least: generate a virtual environment for a head mounted display (HMD) mounted to a model head on a test stand, where the virtual environment includes at least a first shape, where the first shape is a shape that precisely fills a virtual field of view from the first virtual viewpoint, and the virtual environment is configured to replicate hand or body motion in the real-world field of view of the HMD, receive, by a data acquisition system (DAQ), from a first hand contact sensor, signaling indicating contact by an operator's hand, receive, by the DAQ, from a second hand contact sensor, signaling indicating contact by the operator's hand, where the second hand contact sensor is a first distance from the first hand contact sensor, track the operator's hand motion in the real world by one or more body part tracking sensors, update the virtual environment based on a tracked real world position of the operator's hand motion, change the luminance of the HMD based on the virtual environment updating the position of the operator's hand within a minimum threshold distance from a virtual representation of the second hand contact sensor, receive, by the DAQ, from a light sensor mounted on the model head, signaling based on changing the luminance of the HMD, and generate, by the DAQ, a data file encoding the signaling from the first hand contact sensor, the second hand contact sensor, and the light sensor.

In some embodiments, the apparatus further includes computer program instructions for marking a validation start time based on receiving, by the DAQ, signaling indicating contact of the operator's hand with the first hand contact sensor, marking a validation end time based on receiving, by the DAQ, signaling indicating contact of the operator's hand with the second hand contact sensor, determining a difference between the validation start time and the validation end time, determining a speed of the operator's hand movement ($S_h$) between the first hand contact sensor and the second hand contact sensor based on a real-world distance between the first hand contact sensor and the second hand contact sensor, and the difference between the validation start time and the validation end time, determining the test is valid based on $S_h$ being equal to or above a minimum hand speed ($S_{min}$) and equal to or below a maximum hand speed ($S_{max}$) ($S_{min} \leq S_h \leq S_{max}$), and determining the test is not valid based on $S_h$ being one of below the minimum hand speed ($S_h < S_{min}$) or above the maximum hand speed ($S_h > S_{max}$). In some embodiments, the apparatus further includes computer program instructions for marking a movement completion time based on receiving, by the DAQ, signaling indicating contact of the operator's hand with the second hand contact sensor, and marking a movement completion response time based on receiving, by the DAQ, from the light sensor mounted on the model head, changed signaling indicating the changed luminance of the HMD. In some embodiments, the apparatus further includes computer program instructions for determining a difference between the movement completion time and the movement completion response time, and determining a delay in representing hand movement in the virtual environment based on determining the difference between the movement completion time and the movement completion response time.

In a third aspect of the disclosure, a non-transitory computer-readable storage medium is provided. In some examples, the non-transitory computer-readable storage medium includes computer program instructions stored thereon that, when executed by at least one processor, causes a device to perform: generating a virtual environment for a head mounted display (HMD) mounted to a model head on a test stand, where the virtual environment includes at least a first shape, where the first shape is a shape that precisely fills a virtual field of view from the first virtual viewpoint, and the virtual environment is configured to replicate hand or body motion in the real world field of view of the HMD, receiving, by a data acquisition system (DAQ), from a first hand contact sensor, signaling indicating contact by an operator's hand, receiving, by the DAQ, from a second hand contact sensor, signaling indicating contact by the operator's hand, where the second hand contact sensor is a first distance from the first hand contact sensor, tracking the operator's hand motion in the real world by one or more body part trackers, updating the virtual environment based on a tracked real world position of the operator's hand motion, changing a luminance of the HMD based on the virtual environment updating the position of the operator's hand within a minimum threshold distance from a virtual representation of the second hand contact sensor, receiving, by the DAQ, from a light sensor mounted on the model head, signaling based on changing the luminance of the HMD and generating, by the DAQ, a data file encoding the signaling from the first hand contact sensor, the second hand contact sensor, and the light sensor.

In some embodiments, the non-transitory computer-readable storage medium further includes computer program instructions to cause the device to perform marking a validation start time based on receiving, by the DAQ, signaling indicating contact of the operator's hand with the first hand contact sensor, marking a validation end time based on receiving, by the DAQ, signaling indicating contact of the operator's hand with the second hand contact sensor, determining a difference between the validation start time and the validation end time, determining a speed of the operator's hand movement ($S_h$) between the first hand contact sensor and the second hand contact sensor based on a real-world distance between the first hand contact sensor and the second hand contact sensor, and the difference between the validation start time and the validation end time, determining the test is valid based on $S_h$ being equal to or above a minimum hand speed ($S_{min}$) and equal to or below a maximum hand speed ($S_{max}$) ($S_{min} \leq S_h \leq S_{max}$), and determining the test is not valid based on $S_h$ being one of below the minimum hand speed ($S_h < S_{min}$) or above the maximum hand speed ($S_h > S_{max}$). In some embodiments, the non-transitory computer-readable storage medium further includes computer program instructions to cause the device to perform marking a movement completion time based on receiving, by the DAQ, signaling indicating contact of the operator's hand with the second hand contact sensor, marking a movement completion response time based on receiving, by the DAQ, from the light sensor mounted on the model head, changed signaling indicating the changed luminance of the HMD, determining a difference between the movement completion time and the movement completion response time, and determining a delay in representing hand movement in the virtual environment based on determining the difference between the movement completion time and the movement completion response time.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. For example, while motion of a hand had been used in the described method above, other body parts may be substituted. Accordingly, the appended claims are intended to include within their scope such processes, machines, manufacture, compositions of matter, means, methods, or steps.

What is claimed is:

1. A method comprising:
generating a virtual environment of a test scenario for a head mounted display (HMD) mounted to a model head on a test stand, wherein the virtual environment comprises at least a first shape, wherein the first shape is a shape that precisely fills a virtual field of view from a first virtual viewpoint, and the virtual environment is configured to replicate hand or body motion in a real-world field of view of the HMD;
receiving, by a data acquisition system (DAQ), from a first hand contact sensor, signaling indicating contact by an operator's hand;
receiving, by the DAQ, from a second hand contact sensor, signaling indicating contact by the operator's hand, wherein the second hand contact sensor is a first distance from the first hand contact sensor;
tracking the operator's hand motion in the real world by one or more body part tracking sensors;
updating the virtual environment based on a tracked real world position of the operator's hand motion;
changing a luminance of the HMD based on the virtual environment updating the position of the operator's hand within a minimum threshold distance from a virtual representation of the second hand contact sensor;
receiving, by the DAQ, from a light sensor mounted on the model head, signaling based on changing the luminance of the HMD; and
generating, by the DAQ, a data file encoding the signaling from the first hand contact sensor, the second hand contact sensor, and the light sensor.

2. The method according to claim 1, further comprising performing, before contacting the operator's hand to the first hand contact sensor:
sampling, by the DAQ, signaling from the light sensor, based on a first luminance of the HMD related to a first color of the second shape.

3. The method according to claim 1, further comprising performing, before contacting the operator's hand to the first hand contact sensor:
sampling, by the DAQ, signaling from the first hand contact sensor and the second hand contact sensor, based on no contact.

4. The method according to claim 1, further comprising:
marking a validation start time based on receiving, by the DAQ, signaling indicating contact of the operator's hand with the first hand contact sensor; and
marking a validation end time based on receiving, by the DAQ, signaling indicating contact of the operator's hand with the second hand contact sensor.

5. The method according to claim 4, further comprising:
determining a difference between the validation start time and the validation end time;
determining a speed of the operator's hand movement ($S_h$) between the first hand contact sensor and the second hand contact sensor based on a real-world distance between the first hand contact sensor and the second hand contact sensor, and the difference between the validation start time and the validation end time;
determining the test is valid based on $S_h$ being equal to or above a minimum hand speed ($S_{min}$) and equal to or below a maximum hand speed ($S_{max}$) satisfying ($S_{min} \leq S_h \leq S_{max}$); and
determining the test is not valid based on $S_h$ being one of:
below the minimum hand speed ($S_h < S_{min}$); or
above the maximum hand speed ($S_h > S_{max}$).

6. The method according to claim 1, further comprising:
marking a movement completion time based on receiving, by the DAQ, signaling indicating contact of the operator's hand with the second hand contact sensor; and
marking a movement completion response time based on receiving, by the DAQ, from the light sensor mounted on the model head, changed signaling indicating the changed luminance of the HMD.

7. The method according to claim 6, further comprising:
determining a difference between the movement completion time and the movement completion response time; and
determining a delay in representing hand movement in the virtual environment ("hand tracking delay") based on determining the difference between the movement completion time and the movement completion response time.

8. The method according to claim 1, wherein updating the virtual environment based on the tracked real world position of the operator's hand motion comprises suppressing rendering of a virtual representation of the operator's hand in the HMD.

9. The method according to claim 1, wherein the first hand contact sensor and the second hand contact sensor are each one of a capacitive touch sensor, a resistive touch sensor, a surface acoustic wave touch sensor, an infrared touch sensor, or an optical touch sensor.

10. The method according to claim 1, wherein the light sensor is one of a photoresistor, a light-dependent resistor (LDR), a photodiode, or a phototransistor.

11. The method according to claim 1, wherein changing the luminance of the HMD based on the virtual environment updating the position of the operator's hand within the minimum threshold distance from the virtual representation of the second hand contact sensor comprises:
removing the first shape from the virtual environment to reveal a second shape, and a luminance of the second shape is greater than 30000 candela per square meter ($cd/m^2$) based on only the second shape being displayed in the HMD; or
changing the color of the first shape to a second color, wherein a luminance of the second color of the first shape is greater than 30000 $cd/m^2$ based on only the second color of the first shape being displayed in the HMD.

12. The method according to claim 11, wherein a luminance of a first color of the first shape is less than 1000 $cd/m^2$ based on only the first shape being displayed in the HMD.

13. The method according to claim 11, wherein the first shape is of a first color and a second shape is of a second color, wherein the first color and the second color are visually distinguishable, and wherein a luminance difference between displaying only the first shape in the HMD and only the second shape in the HMD is greater than 15000 candela per square meter ($cd/m^2$).

14. An apparatus comprising:
one or more processors; and
at least one non-transitory computer readable memory connected to the one or more processors and including computer program code, wherein the at least one non-transitory computer readable memory and the computer program code are configured, with the one or more processors, to cause the apparatus to at least:
generate a virtual environment for a head mounted display (HMD) mounted to a model head on a test stand, wherein the virtual environment comprises at least a first shape, wherein the first shape is a shape that precisely fills a virtual field of view from a first virtual viewpoint, and the virtual environment is configured to replicate hand or body motion in a real-world field of view of the HMD;

receive, by a data acquisition system (DAQ), from a first hand contact sensor, signaling indicating contact by an operator's hand;

receive, by the DAQ, from a second hand contact sensor, signaling indicating contact by the operator's hand, wherein the second hand contact sensor is a first distance from the first hand contact sensor;

track the operator's hand motion in the real world by one or more body part tracking sensors;

update the virtual environment based on a tracked real world position of the operator's hand motion;

change a luminance of the HMD based on the virtual environment updating the position of the operator's hand within a minimum threshold distance from a virtual representation of the second hand contact sensor;

receive, by the DAQ, from a light sensor mounted on the model head, signaling based on changing the luminance of the HMD; and generate, by the DAQ, a data file encoding the signaling from the first hand contact sensor, the second hand contact sensor, and the light sensor.

15. The apparatus according to claim 14, wherein the computer program code further comprises computer program code for:

marking a validation start time based on receiving, by the DAQ, signaling indicating contact of the operator's hand with the first hand contact sensor;

marking a validation end time based on receiving, by the DAQ, signaling indicating contact of the operator's hand with the second hand contact sensor;

determining a difference between the validation start time and the validation end time;

determining a speed of the operator's hand movement ($S_h$) between the first hand contact sensor and the second hand contact sensor based on a real-world distance between the first hand contact sensor and the second hand contact sensor, and the difference between the validation start time and the validation end time;

determining the test is valid based on $S_h$ being equal to or above a minimum hand speed ($S_{min}$) and equal to or below a maximum hand speed ($S_{max}$) satisfying ($S_{min}\leq S_h \leq S_{max}$); and determining the test is not valid based on $S_h$ being one of:

below the minimum hand speed ($S_h < S_{min}$); or above the maximum hand speed ($S_h > S_{max}$).

16. The apparatus according to claim 14, wherein the computer program code further comprises computer program code for:

marking a movement completion time based on receiving, by the DAQ, signaling indicating contact of the operator's hand with the second hand contact sensor; and marking a movement completion response time based on receiving, by the DAQ, from the light sensor mounted on the model head, changed signaling indicating the changed luminance of the HMD.

17. The apparatus according to claim 16, wherein the computer program code further comprises computer program code for:

determining a difference between the movement completion time and the movement completion response time; and determining a delay in representing hand movement in the virtual environment based on determining the difference between the movement completion time and the movement completion response time.

18. A non-transitory computer-readable storage medium having computer program instructions stored thereon that, when executed by at least one processor, causes a device to perform:

generating a virtual environment for a head mounted display (HMD) mounted to a model head on a test stand, wherein the virtual environment comprises at least a first shape, wherein the first shape is a shape that precisely fills a virtual field of view from a first virtual viewpoint, and the virtual environment is configured to replicate hand or body motion in the real-world field of view of the HMD;

receiving, by a data acquisition system (DAQ), from a first hand contact sensor, signaling indicating contact by an operator's hand;

receiving, by the DAQ, from a second hand contact sensor, signaling indicating contact by the operator's hand, wherein the second hand contact sensor is a first distance from the first hand contact sensor;

tracking the operator's hand motion in the real world by one or more hand trackers;

updating the virtual environment based on a tracked real world position of the operator's hand motion;

changing a luminance of the HMD based on the virtual environment updating the position of the operator's hand within a minimum threshold distance from a virtual representation of the second hand contact sensor;

receiving, by the DAQ, from a light sensor mounted on the model head, signaling based on changing the luminance of the HMD; and generating, by the DAQ, a data file encoding the signaling from the first hand contact sensor, the second hand contact sensor, and the light sensor.

19. The non-transitory computer-readable storage medium according to claim 18, wherein the computer program instructions further comprise computer program instructions to cause the device to perform:

marking a validation start time based on receiving, by the DAQ, signaling indicating contact of the operator's hand with the first hand contact sensor;

marking a validation end time based on receiving, by the DAQ, signaling indicating contact of the operator's hand with the second hand contact sensor;

determining a difference between the validation start time and the validation end time;

determining a speed of the operator's hand movement ($S_h$) between the first hand contact sensor and the second hand contact sensor based on a real-world distance between the first hand contact sensor and the second hand contact sensor, and the difference between the validation start time and the validation end time;

determining the test is valid based on $S_h$ being equal to or above a minimum hand speed ($S_{min}$) and equal to or below a maximum hand speed ($S_{max}$) satisfying ($S_{min}\leq S_h \leq S_{max}$); and determining the test is not valid based on $S_h$ being one of:

below the minimum hand speed ($S_h < S_{min}$); or above the maximum hand speed ($S_h > S_{max}$).

20. The non-transitory computer-readable storage medium according to claim 18, wherein the computer program instructions further comprise computer program instructions to cause the device to perform:

marking a movement completion time based on receiving, by the DAQ, signaling indicating contact of the operator's hand with the second hand contact sensor;

marking a movement completion response time based on receiving, by the DAQ, from the light sensor mounted on the model head, changed signaling indicating the changed luminance of the HMD;

determining a difference between the movement completion time and the movement completion response time; and determining a delay in representing hand movement in the virtual environment based on determining the difference between the movement completion time and the movement completion response time.

* * * * *